US008329346B2

(12) United States Patent
Janse van Rensburg et al.

(10) Patent No.: US 8,329,346 B2
(45) Date of Patent: Dec. 11, 2012

(54) BATTERY HAVING AN AIR MANAGER WITH A MOVING PLATE VALVE

(75) Inventors: Richard Janse van Rensburg, Great Cambourne (GB); David M. Blakey, Bishop's Stortford (GB); Steven D. Jones, North Ridgeville, OH (US); Jerald D. Baldwin, Jr., Defiance, MO (US); Richard A. Langan, Parma, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 13/331,014

(22) Filed: Dec. 20, 2011

(65) Prior Publication Data
US 2012/0164545 A1    Jun. 28, 2012

Related U.S. Application Data

(63) Continuation of application No. PCT/US2010/040766, filed on Jul. 1, 2010.

(60) Provisional application No. 61/222,148, filed on Jul. 1, 2009.

(51) Int. Cl.
H01M 12/06 (2006.01)
H01M 2/02 (2006.01)

(52) U.S. Cl. ........................................ 429/407; 429/402

(58) Field of Classification Search ........... 429/402–407
See application file for complete search history.

(56) References Cited

U.S. PATENT DOCUMENTS

| 5,079,106 | A | 1/1992 | Urry |
| 5,554,452 | A | 9/1996 | Delmolino et al. |
| 5,733,676 | A | 3/1998 | Dopp et al. |
| 5,795,667 | A | 8/1998 | McKenzie et al. |
| 6,383,674 | B1 | 5/2002 | Urry |
| 6,492,046 | B1 | 12/2002 | Payne et al. |
| 6,500,575 | B1 | 12/2002 | Shiue et al. |
| 6,558,828 | B1 | 5/2003 | Guo |
| 6,641,947 | B1 | 11/2003 | Molloy et al. |
| 6,955,187 | B1 | 10/2005 | Johnson |
| 2002/0150814 | A1 | 10/2002 | Causton et al. |
| 2003/0186099 | A1 | 10/2003 | Liu et al. |
| 2005/0136321 | A1 | 6/2005 | Bailey |
| 2009/0081519 | A1 | 3/2009 | Bailey |

FOREIGN PATENT DOCUMENTS

| WO | 2002035641 A1 | 5/2002 |
| WO | 2006101491 A1 | 9/2006 |
| WO | 2007121254 A1 | 10/2007 |

OTHER PUBLICATIONS

Patent Cooperation Treaty (PCT), International Search Report and Written Opinion for Application No. PCT/US2010/040766, filed Jul. 1, 2010, mailed Sep. 22, 2010, European Patent Office, Netherlands.

*Primary Examiner* — Gregg Cantelmo
(74) *Attorney, Agent, or Firm* — Russell H. Toye, Jr.

(57) ABSTRACT

A gas consuming battery is provided with an air regulating system for regulating the flow of air into the battery. The air regulating system includes a valve having a moving plate disposed adjacent to another plate. The moving plate and the other plate can both have apertures therethrough that at least partially align in an open valve and are misaligned in a closed valve. The air regulating system can also include an actuator for moving the moving plate to open and close the valve. A sealing medium including a fluid containment layer and a fluid partially contained therein is disposed between the moving and fixed plates to enhance valve operation and sealing effectiveness. The fluid containment layer includes a porous material, and the fluid has a maximum wicking height, that is equal to or greater than a maximum interfacial dimension between the valve plates.

15 Claims, 12 Drawing Sheets

PRIOR ART

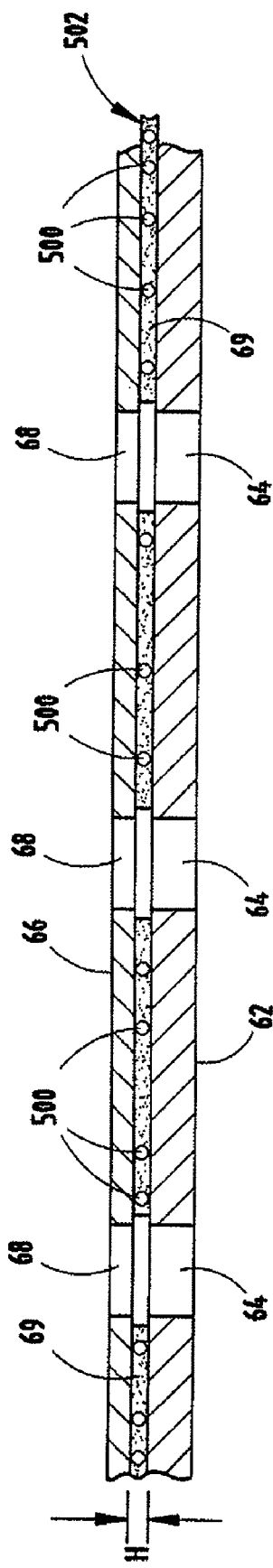
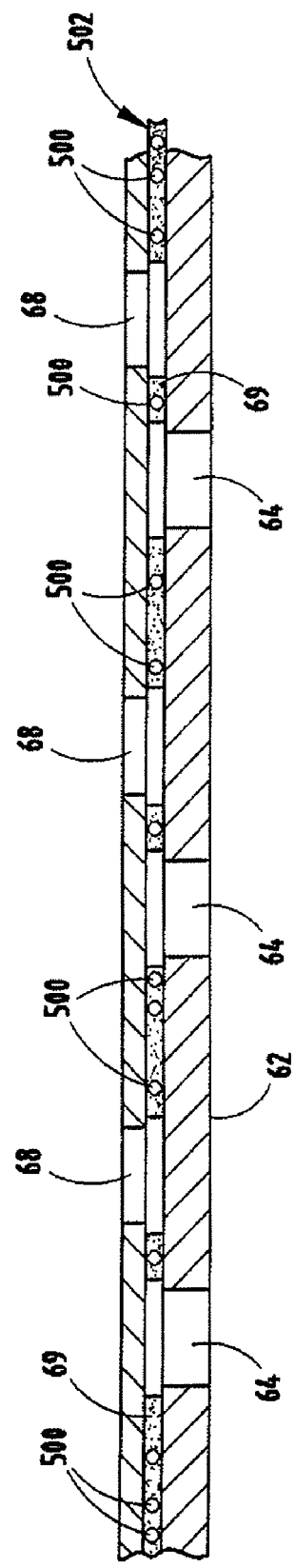
FIG. 22
FIG. 23

BATTERY HAVING AN AIR MANAGER WITH A MOVING PLATE VALVE

This application is a continuation of International Application No. PCT/US2010/040766, filed Jul. 1, 2010, which claims the benefit of U.S. Provisional Application No. 61/222,148, filed Jul. 1, 2009, both of which are fully incorporated herein by reference.

BACKGROUND OF THE INVENTION

This invention relates to air regulating systems for controlling the rate of entry of air and other gases, into and out of electrochemical batteries and cells with gas consuming electrodes, and to the batteries and cells in which such air regulating systems are used, particularly air-depolarized, air-assisted and fuel cells and batteries.

Electrochemical battery cells that use a fluid, such as oxygen and other gases, from outside the cell as an active material to produce electrical energy, such as air-depolarized, air-assisted and fuel cell battery cells, can be used to power a variety of portable electronic devices. For example, air enters into an air-depolarized or air-assisted cell, where it can be used as, or can recharge, the positive electrode active material. The oxygen reduction electrode promotes the reaction of the oxygen with the cell electrolyte and, ultimately, the oxidation of the negative electrode active material with the oxygen. The material in the oxygen reduction electrode that promotes the reaction of oxygen with the electrolyte is often referred to as a catalyst. However, some materials used in oxygen reduction electrodes are not true catalysts because they can be at least partially reduced, particularly during periods of relatively high rate of discharge.

One type of air-depolarized cell is a zinc/air cell. This type of cell uses zinc as the negative electrode active material and has an aqueous alkaline (e.g., KOH) electrolyte. Manganese oxides that can be used in zinc/air cell air are capable of electrochemical reduction in concert with oxidation of the negative electrode active material, particularly when the rate of diffusion of oxygen into the air electrode is insufficient. These manganese oxides can then be reoxidized by the oxygen during periods of lower rate discharge or rest.

Air-assisted cells are hybrid cells that contain consumable positive and negative electrode active materials as well as an oxygen reduction electrode. The positive electrode can sustain a high discharge rate for a significant period of time, but through the oxygen reduction electrode, oxygen can partially recharge the positive electrode during periods of lower or no discharge, so oxygen can be used for a substantial portion of the total cell discharge capacity. This means the amount of positive electrode active material put into the cell can be reduced and the amount of negative electrode active material can be increased to increase the total cell capacity. Examples of air-assisted cells are disclosed in commonly assigned U.S. Pat. Nos. 6,383,674 and 5,079,106.

An advantage of air-depolarized, air-assisted, fuel cells is their high energy density, since at least a portion of the active material of at least one of the electrodes comes from or is regenerated by a gas contained in air from outside the cell.

A disadvantage of these cells is that the maximum discharge rates they are capable of can be limited by the rate at which oxygen can enter the oxygen reduction electrode. In the past, efforts have been made to increase the rate of oxygen entry into the oxygen reduction electrode and/or control the rate of entry of undesirable gases, such as carbon dioxide, that can cause wasteful reactions, as well as the rate of water entry or loss (depending on the relative water vapor partial pressures outside and inside the cell) that can fill void space in the cell intended to accommodate the increased volume of discharge reaction products or dry the cell out, respectively. Examples of these approaches can be found in U.S. Pat. No. 6,558,828; U.S. Pat. No. 6,492,046; U.S. Pat. No. 5,795,667; U.S. Pat. No. 5,733,676; U.S. Patent Publication No. 2002/0150814; and International Patent Publication No. WO02/35641. However, changing the diffusion rate of one of these gases generally affects the others as well. Even when efforts have been made to balance the need for a high rate of oxygen diffusion and low rates of $CO_2$ and water diffusion, there has been only limited success.

At higher discharge rates, it is more important to get sufficient oxygen into the oxygen reduction electrode, but during periods of lower discharge rates and periods of time when the cell is not in use, the importance of minimizing $CO_2$ and water diffusion increases. To provide an increase in air flow into the cell only during periods of high rate discharge, fans have been used to force air into cells (e.g., U.S. Pat. No. 6,500,575), but fans and controls for them can add cost and complexity to manufacturing, and fans, even micro fans, can take up valuable volume within individual cells, multiple cell battery packs and devices.

Another approach that has been proposed is to use valves to control the amount of air entering the cells (e.g., U.S. Pat. No. 6,641,947 and U.S. Patent Publication No. 2003/0186099), but external means, such as fans and/or relatively complicated electronics, can be required to operate the valves.

Yet another approach has been to use a water impermeable membrane between an oxygen reduction electrode and the outside environment having flaps that can open and close as a result of a differential in air pressure, e.g., resulting from a consumption of oxygen when the battery is discharging (e.g., U.S. Patent Publication No. 2003/0049508). However, the pressure differential may be small and can be affected by the atmospheric conditions outside the battery.

Reducing friction between the plates of a sliding plate valve by applying a layer of a polymeric film, such as a polyethylene film on, or some other means of reducing the frictional resistance, such as a silicon oil, between a sliding magnetic valve plate and a stationary plate is disclosed in U.S. Pat. No. 5,554,452. U.S. Patent Publication No. 2005/0136321 discloses the application of materials, such as polymeric coatings or films or liquids such as silicon-based oils, to interfacial surfaces of adjacent valve plates to improve the effectiveness of the sliding plate valve seal in the closed position; the improvement can result from reducing friction, filling in imperfections in the interfacial surfaces, or, when an oil is used, through capillary attraction between the plates. U.S. Patent Publication No. 2009/0081519 discloses the addition of round members to a fluid between the valve plates to further improve the seal effectiveness and operation of a sliding plate valve.

It is desirable to further improve the operation and effectiveness of an air regulating system for controlling the flow of air into a gas consuming cell and overcome disadvantages in previous attempts to do so. It is an object of the invention to provide an air regulating system with a valve having two plates, and capable of providing a seal between the plates when the valve is closed over a long period of time. It is also an object of the invention to provide an air regulating system including a valve that can be well sealed over a long period of time and can be operated by applying only a small force. It is a further object of the invention to provide a battery with a gas consuming electrode and an improved air regulating system for controlling the passage of air into the battery, wherein the air regulating system is effective for a long period of time without adversely affecting battery performance.

SUMMARY OF THE INVENTION

According to one aspect of the present invention, an air regulating system is provided for controlling the passage of air into a battery cell that uses a gas contained in the air as an active material. The air regulating system includes a valve including a first plate having at least one aperture therethrough and a second plate having at least one aperture therethrough, an actuator for moving the first plate relative to the second plate to open and close the valve to regulate the passage of air into the cell, and a sealing medium disposed between the first plate and the second plate. The sealing medium includes a fluid containment layer and a fluid partially contained within the fluid containment layer. The fluid containment layer includes a porous polymeric material having an average pore size of from 0.03 micrometer to 15 micrometers, as determined by a bubble point method using a capillary flow porometer. A maximum wicking height of the fluid on the porous polymeric material is equal to or greater than a maximum interfacial dimension of the first and second plates, the maximum wicking height being determined by suspending a strip of the porous polymeric material vertically above a surface of a sample of the fluid.

According to another aspect of the present invention, a battery is provided, including a battery cell, the battery cell having a gas consuming electrode using a gas contained in air from outside the cell as an active material, a counter electrode, an electrolyte, a housing containing the electrodes and electrolyte and having at least one opening through which air can enter the housing, and an air regulating system as described above.

These and other features, advantages, and objects of the present invention will be further understood and appreciated by those skilled in the art by reference to the following specification, claims, and appended drawings.

Unless otherwise specified herein, all disclosed characteristics, ranges and testing are at room temperature (20-25° C.), and where values in non-SI units are shown, the non-SI values ore original values and the SI values are calculated conversions.

BRIEF DESCRIPTION OF THE DRAWINGS

In the drawings:

FIG. 22 is a partial cross-sectional view of the valve in FIG. 20 showing the valve plates in the open position; and FIG. 23 is a partial cross-sectional view of the valve in FIG. 20 showing the valve plates in the closed position.

DETAILED DESCRIPTION OF THE INVENTION

Figure 1:
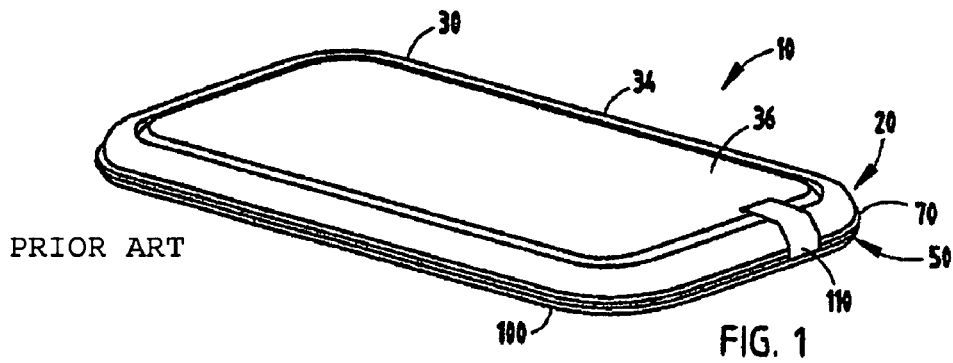
FIG. 1 is a perspective view of a battery constructed in accordance with a first embodiment of the present invention showing the top of the battery.

Embodiments of this invention include a battery that includes an electrochemical cell that utilizes a gas (such as oxygen or another gas), contained in air from outside the cell, as an active material for one of the electrodes. The cell has a gas consuming electrode, such as an oxygen reduction electrode. Examples of cells that can have a gas consuming electrode include air-depolarized, air-assisted and fuel cells. An air regulating system, also referred to below as an air manager, is used in conjunction with the battery for adjusting the rate of passage of air to the gas consuming electrode (e.g., the air electrodes in air-depolarized and air-assisted cells) to provide a sufficient amount of the gas from outside the cell for discharge of the cell at a high rate, while minimizing entry of air into the gas consuming electrode and water gain or loss into or from the cell during periods of low rate or no discharge.

Preferably the air regulating system will have a fast response to changes in cell potential, a long cycle lifetime, a low operating voltage that is well matched to the cell voltage range on discharge, and a high efficiency. In addition, the regulating system will preferably have a low permeability to air and other gases being managed in the closed position, open and close in proportion to the need for the active gas in the cell, require only a very small amount of the total cell discharge capacity, have a small volume and be easy and inexpensive to manufacture and incorporate into or onto the cell.

The air manager includes a moving plate valve, such as a sliding plate valve or a buckling plate valve, in which one plate moves with respect to another plate to open and close the valve. One plate can be a stationary plate and the other plate can be a moving plate, or both plates can move. At least one of the plates has at least one aperture therethrough for the passage of air through the valve. In a sliding plate valve, the plates are typically parallel to one another. The relative motion between the plates can be a linear motion or a rotational motion (e.g., where one plate rotates about a pivot point) such that the plates typically remain parallel to each other, and each plate has at least one aperture. An aperture or apertures in one plate are out of alignment when the valve is closed and at least partially aligned when the valve is in an open position. In a buckling valve, a moving plate deforms to pull away from the other plate to create an opening between the plates, and air can flow through the passageway formed by the opening and the aperture or apertures in one or both plates in an open position, but at least a portion of each of the plates is essentially against at least a portion of the other plate so there is no air passageway when the valve is closed.

A sealing medium is disposed between the interfacial surfaces of the plates of the moving plate valve. The sealing medium includes a film or coating on one or both of the plates, forming a fluid containment layer, and a sealing fluid. The fluid provides an enhanced seal between the plates, and the film or coating has pores that retain the fluid in the desired areas of the interface between the plates. One or both of the film or coating and the fluid can also provide a reduction in friction compared to the friction between the plates compared to the friction between the plates in the absence of the sealing medium.

It has been discovered that using a medium that consists of only a film or coating on the plate(s) or only a fluid between the plates can have shortcomings. A film or coating can reduce the friction between the plates so the sliding plate slides more easily, requiring less energy to operate, but such a film or coating alone may do little to improve the effectiveness of the seal between the plates when the valve is closed. Applying a fluid to the interfacial surfaces of the plates can provide a more effective seal and may also reduce the sliding friction between the plates. However, the surface tension between the fluid and the plates has been found to be inadequate to keep the fluid from flowing out of the interface between the valve plates, where it is needed to maintain a good seal, and into other parts of the air manager and the cell. To maintain an improved seal between the plates, the fluid must be in contact with the interfacial surfaces of both plates such that there is not an open pathway between an aperture in one plate and an aperture in the other plate through which air or other gases can directly pass. While the flow of sealing fluid from the interface between the plates can be reduced through selecting the surface characteristics of the plates and the type of fluid to increase the surface tension, the best combinations tested were still inadequate. Retention of fluid between the plates can also be affected by temperature, opening and closing the valve, and orientation of the valve (due to the effect of gravity), as well as the valve design.

However, it has also been discovered that using a suitable combination of sealing fluid with certain films or coating materials on one or both plates can overcome the problems associated with each when used separately because the film or coating functions as a fluid containment layer that can help retain the fluid in the interface between the two plates. In an embodiment at least a portion of the plate with the smaller surface area is covered with the film or coating. Alternatively, only a limited portion of the larger surface area plate, such as its entire interfacial area over the full range of movement of the moving plate, can be covered with the film or coating.

It is desirable for the film or coating to be easy to apply to one or both valve plates and remain in place between the plates, without pulling away from the plates during expected conditions of storage and use. It is also desirable for the film or coating to be wettable with the fluid; i.e., it should not to repel the fluid, but provide sufficient attraction to substantially retain the fluid, e.g., by capillary attraction and/or absorption, and minimize fluid flow over a long period of time. Thickness, porosity, average pore size and tortuosity can affect the ability of the film or coating to retain the fluid. It is also desirable that the film or coating have a relatively low permeability to air gases such as oxygen, carbon dioxide and water vapor to minimize the flow of gases through the film or coating when the valve is closed. In selecting a film or coating material, interactions between the film or coating and the fluid should also be considered, as described below. Films or coatings that may be suitable include polymeric materials, such as polytetrafluoroethylene (PTFE), polypropylene and polyethylene. Preferably the polymeric material is non-sintered. Papers may also be suitable. Films and papers can be woven, or they can be nonwoven.

Fluids suitable for use in the sealing medium desirably have low volatility over the expected range of storage and use conditions to minimize evaporation. Viscosity of the fluid can also affect its effectiveness—if the viscosity is too low it may flow too readily or too much may be absorbed into the fluid containment layer, and if the viscosity is too high it may require too much energy to operate the valve. It is also desirable that the fluid be sufficiently attracted by the film or coating to be substantially retained in the interface between the valve plates, without flowing elsewhere in the air manager or out of the air manager to include into the battery. In some embodiments the fluid will also provide reduced friction between the plates. In selecting a fluid, interactions between the fluid and the film or coating material as well as any uncovered plate surfaces in the interface area should also be considered, as described below. Examples of suitable fluids include but are not limited to fluorocarbon liquids, such as perfluoroalkylethers (e.g., KRYTOX® 100 series general purpose lubricants, such as KRYTOX® 102 general purpose oil, from DuPont de Nemours International S.A) and silicone based fluids, such as fluids containing siloxane polymers (e.g., grade 702, 704 and 705 diffusion pump oils from Dow Corning). Other suitable fluids can be used according to other embodiments. The amount of fluid used will be a function of the combined interfacial area of the plates, the size of the gap between the interfacial surfaces and the surface tension between the fluid and interfacial surfaces.

Desirably the plate, film and coating surfaces will be clean before use to avoid interference with interactions between those surfaces and the fluid. If the attraction between the fluid and the film or coating surface is significantly greater than the attraction between the fluid and either of the bare plate surfaces, the fluid can be retained between the plates for a significantly longer time, even when the plates are oriented with their interfacial surfaces in a vertical position. It is preferred that the surface tension between the fluid and the film or coating surface be significantly greater than the force exerted by gravity so the surface tension will dominate the flow of the fluid under gravity when the valve plates are in a vertical position.

The valve plates can be made from any suitable materials. The materials selected should be mechanically stable and resistant to corrosion in the environments in which the device and battery are expected to be used. In some embodiments they can be electrically conductive or nonconductive. Interfacial surfaces of the plates that are not covered with the film or coating should be smooth, and interfacial sealing surfaces of the plates should conform to each other in shape when the valve is closed to maximize the effectiveness of the seal between the plates.

In some embodiments, one or both valve plates can be made of a magnetic material so the adjacent valve plates will be attracted to each other to maximize the effectiveness of the seal between the plates. The magnetic plate(s) can be made from any suitable magnetic material, such as a blend of ferromagnetic (e.g., barium/strontium ferrite) and elastomeric materials. The magnetic plate can be a permanent magnet that does not consume energy from the battery to maintain sufficient magnetic force. When at least one of the plates is magnetic, one of the plates can be flexible in order to conform to the shape of the other plate, even if the other plate is not perfectly flat.

As described further below with respect to FIGS. 1-3, a battery 10 in accordance with the present invention includes a gas consuming cell 20 and an air regulating system 50. The air regulating system 50 regulates the flow of air containing the gas to the gas consuming electrode of gas consuming cell 20. For an air-depolarized cell, the air regulating system can be disposed on the inside or outside of a cell housing 30 of gas consuming cell 20 and on the air side of the oxygen reduction electrode (i.e., on, or a part of, the surface of the oxygen reduction electrode that is accessible to air from the outside of the cell housing).

As shown, cell 20 (in this case an air-depolarized cell) includes a cell housing 30, which includes a first housing component and a second housing component, which may include a can 34 and a cover 36, respectively, or may have shapes or sizes differing from what would otherwise be considered a can or cover. For purposes of example, the first housing component is hereinafter referred to as can 34, while the second housing component is hereinafter referred to as cover 36. Can 34 and cover 36 are both made of an electrically conductive material, but are electrically insulated from one another by means of a gasket 38 (see FIG. 8). Can 34 can serve as the external positive contact terminal for the cell 20, whereas cover 36 can serve as the external negative contact terminal. As discussed further below, cell 20 further includes a first electrode 40, which may be the gas consuming electrode (e.g., positive air electrode, or cathode), a second electrode 42, which may be the negative electrode (i.e., anode), and a separator 44 disposed between the first and second electrodes (see FIG. 8). First electrode 40 is preferably electrically coupled to can 34, whereas second electrode 42 is preferably electrically coupled to cover 36.

Figure 8:
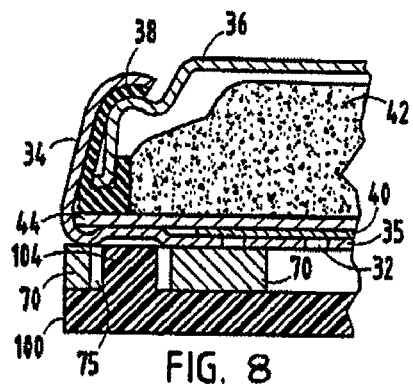
FIG. 8 is a partial cross-sectional view of one possible implementation of the battery construction shown in FIG. 7 in an inverted orientation relative to FIG. 7.

Can 34 includes a bottom surface 35 in which a plurality of air entry ports 32 are provided such that air may pass to the interior of cell housing 30 so as to reach the gas consuming electrode 40 (see FIG. 8).

Figure 2:
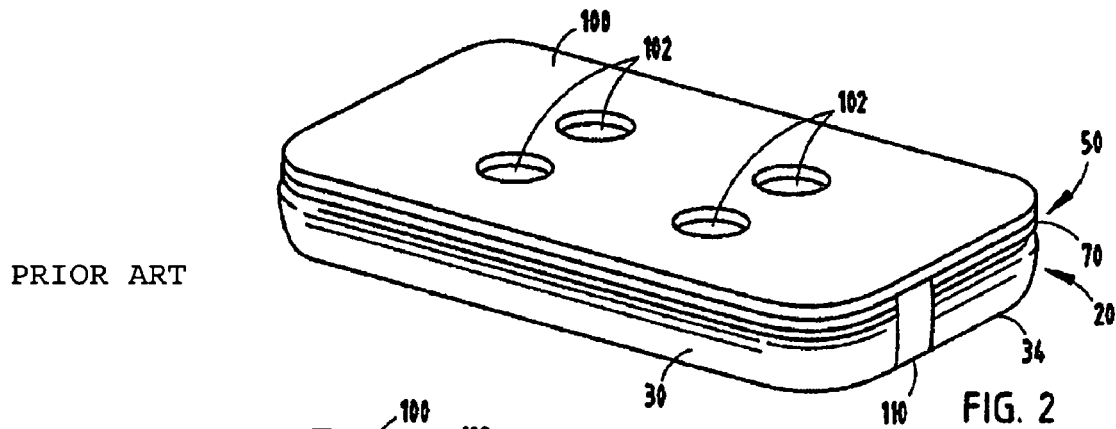
FIG. 2 is a perspective view of the battery shown in FIG. 1 showing the bottom of the battery.
Figure 3:
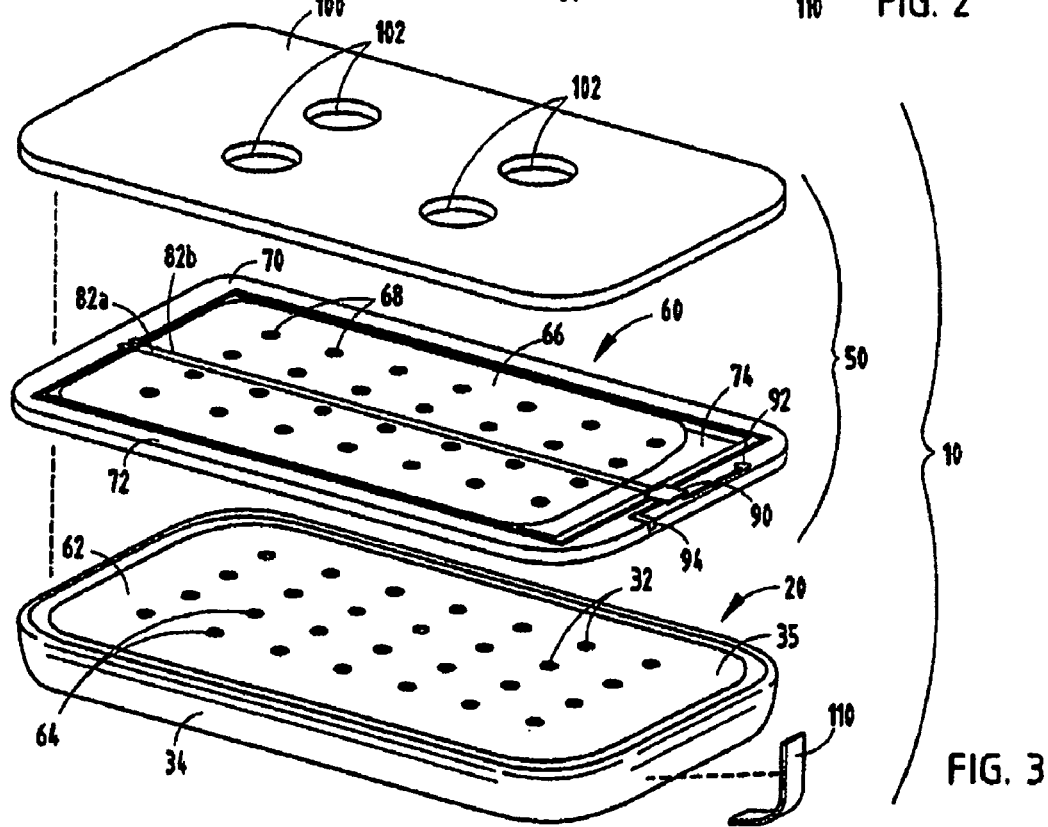
FIG. 3 is an exploded perspective view showing the bottom of the battery along with the components forming an air regulating system used with the battery.

In the embodiment shown in FIGS. 1-3, an air regulating system 50 is secured to the exterior of bottom surface 35 of can 34. Examples of ways in which the air regulating system 50 may be attached to the exterior of cell 20 are described further below. Further embodiments are described in which air regulating system 50 is incorporated on the inside of gas consuming cell 20.

The air regulating system 50 according to this particular embodiment may include a valve 60 including a first plate 62 (which may correspond to bottom surface 35 of can 34) having a plurality of apertures 64 (which may correspond to air entry ports 32), and a movable second plate 66 including a plurality of apertures 68 that correspond in size, shape, number, and position to apertures 64 formed in first plate 62. The size, shape, number, and position of apertures 64 and 68 are preferably optimized to provide the desired volume and distribution of air applied to the gas consuming electrode. The size, shape, number and relative location of apertures, 64 do not have to be the same as the size, shape, number and relative location of apertures 68. For example, if apertures 64 are slightly different in size from apertures 68, precise alignment of apertures 64 and 68 is not essential to achieve the maximum total open area through plates 62 and 66.

Air regulating system 50 may further include a chassis 70 having an annular body portion 72 with an opening 74 in which second plate 66 is disposed. Opening 74 is preferably shaped and sized to contact the elongated side edges of plate 66 while providing excess space at the shorter side of plate 66 such that plate 66 may be slid linearly along an axis in parallel with its longest dimension. Thus, as shown in FIGS. 5A and 5B, the apertures 68 of second plate 66 may be moved into and out of alignment with apertures 64 of first plate 62 to thereby open and close valve 60. The chassis is preferably configured as further discussed below, to guide and possibly retain second plate 66 adjacent the first plate 62.

As shown in FIGS. 5A and 5B, a sealing medium including a fluid layer 69 is disposed between plates 62 and 66. The sealing medium also includes a layer of film or a coating covering at least the interfacial portion of at least one of the interfacial surfaces of plates 62 and 66 to retain the fluid layer 69 between the plates 62 and 66 for a prolonged period of time. Other valve embodiments described below include a sealing medium like that in FIGS. 5A and 5B.

Figure 7:
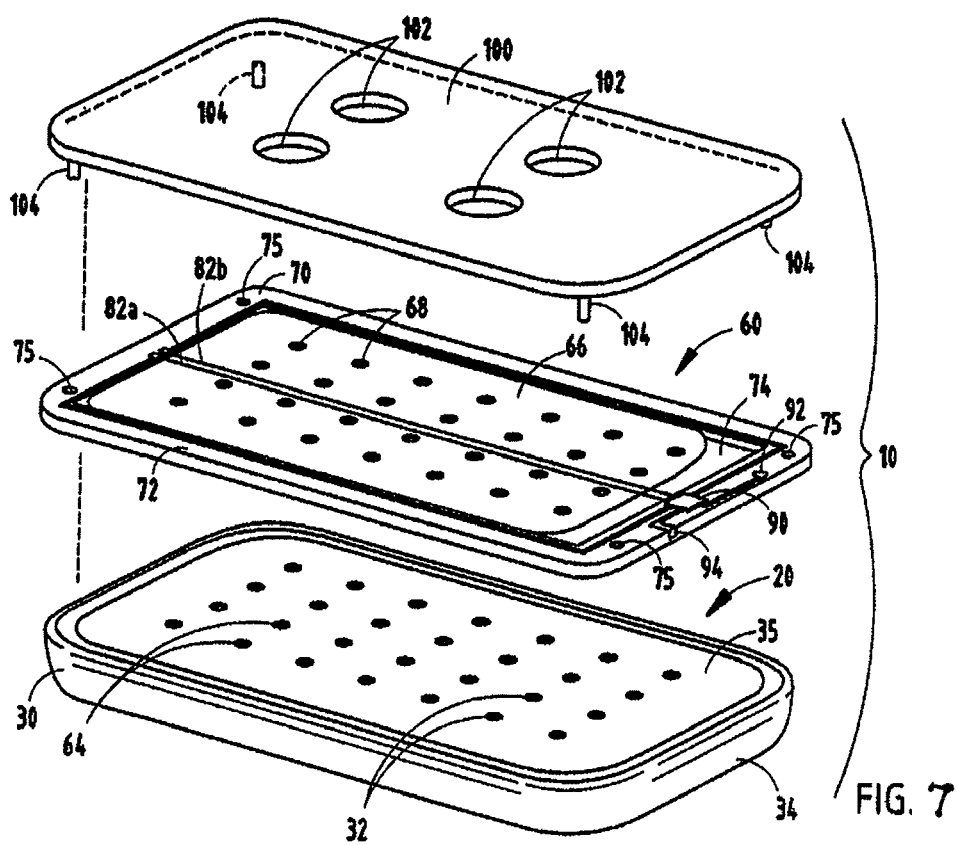
FIG. 7 is an exploded perspective view of a variation of the battery of the first embodiment of the present invention.

In the embodiments shown in FIGS. 3 and 7, moveable second plate 66 can be constrained on the top and bottom by a lid 100 (as described further below) and bottom surface 35 of can 34. In an alternative embodiment, battery 10 has an air regulating system including a chassis that is taller than chassis 70 in FIGS. 3 and 12 to facilitate the movement of air between the lid and the moveable plate, thereby providing more uniform distribution of air across the surface of the moveable plate and more uniform flow of air through the apertures when the plates are aligned in an open position.

Chassis 70 can include an inward extending ledge, creating a race or groove within which plate 66 can slide. The vertical position of the ledge can be selected to create a race of the desired dimensions to hold plate 66 firmly enough against surface 35 to provide a good seal when plates 66 and 62 are aligned in a closed position but not so tightly as to interfere with the desired sliding motion of plate 66. The ledge can be an integral part of chassis 70, or it can be a separate component. For example, the ledge can be in the form of a flat washer or strip insert molded into the chassis body 72, or it can be a separate component affixed to the chassis body 72. The ledge can be made of the same material as chassis body 72 or a different material. Materials for the chassis body 72 and the ledge can be selected to provide both the desired strength and smooth sliding of plate 66 within the race. If either the chassis body 72 or the ledge is made from an electrically conductive material, insulation from the electrical components of the actuator and control circuit 90 may be required. As an alternative to a continuous ledge, a discontinuous ledge or a series of projections can be used.

The ledge and/or chassis body 72 can also be modified to incorporate one or more additional structures, such as ribs extending across the opening 74 above plate 66, to hold the central portion of plate 66 flat. Alternatively, downward projections from the lid 100 can be used to hold the central portion of plate 66 flat.

In another embodiment, the chassis 70 can include a second race in which a lid is held. This second race can be formed by one or more additional ledges. This arrangement can facilitate pre-assembly of the lid and components of the air regulating system, to be added to the gas consuming cell at another step in the manufacturing process. In another embodiment in which the stationary plate 62 is not a surface 35 of the can 34, the chassis 70 can include another ledge below the first ledge, forming a larger race that retains the stationary plate 62 as well as movable plate 66.

The ledge can be a continuous ledge extending around the entire perimeter of opening 74, or it can be a discontinuous ledge extending along only part of the perimeter. If the discontinuous ledge is suitably located and the moving plate 66 is sufficiently flexible, if the pressure within the cell becomes excessive, the edge of the moving plate 66 can bow outward between the ends of the discontinuous ledge to provide a passageway between the plate 66 and both plate 62 and chassis frame 72 through which gases can escape to the external environment when the valve is partially open or closed. In such embodiments the plate 66 preferably has spring-like properties so that when the internal cell pressure is sufficiently reduced the plate 66 will again conform to the shape of the surface 35 of the can 34.

In an alternative embodiment in which the lid serves as the stationary valve plate and the moveable plate is disposed adjacent to the lid, the chassis can include a ledge to hold the moveable plate against the lid while maintaining a space between the moveable plate and the surface of the can bottom, to facilitate uniform air distribution to the apertures in the can. As described above, this embodiment can also include a second race in the chassis in which the lid is held.

The air regulating system can be actuated in response to the voltage of the gas consuming cell, as described below, or it can be actuated by the user, or a combination of methods can be used. For example, when the user of a device powered by the device turns the device switch to the on position, the valve can be initially opened by mechanical action, and when the user turns the device switch to the off position, the valve can be initially closed by mechanical action. While the device switch remains in the on position, a control circuit can control the operation of the valve. In another example, when the device is turned on, power from the cell can be applied to the air regulating system to initially open the valve, and when the device is turned off, the valve can be actuated to close.

An actuator is preferably provided as a part of air regulating system 50 to actuate valve 60. The actuator may include a control circuit 90 that senses the voltage of gas consuming cell 20 and which generates a control signal in response to the detected cell voltage. Circuit 90 may be an application specific integrated circuit (ASIC), which is preferably mounted on a surface of chassis 70. The body 72 of chassis 70 is preferably made of a non-conductive material such that tracings may be printed on a surface of the chassis as further discussed below. Chassis 70 may thus be a printed circuit board. The chassis could be molded or shaped and most or all of the electrical connections could be pressure contacts to minimize the sophistication of assembly. The chassis may, however, require some machining and some electrical connections and may require some soldering or welding. The selection of the chassis material may be based on its compatibility with its multi-functional use as a frame to house the valve, as a printed circuit board for the electronics, and for its ability/compatibility to be attached to the cell. A strategic depression may be provided in and/or on a laminar structure of the chassis for mounting the control circuit 90. This would allow any mounted parts to be maintained flush with the surface of the chassis to facilitate assembly with the cell. It is also possible that it may become desirable to coat the printed circuit tracings with a nonconductive material to prevent shorting if pressed against a metal lid 100 or can 34. Alternatively, one or more recesses may be provided in the chassis, such as by molding or machining, to accommodate all or a portion of one or more components of the control circuit and the actuator. These recesses can be useful to allow positioning of components in different locations on the chassis and anchoring of components that extend beyond the chassis frame, as described below.

As a platform for the electronics, it would be desirable for the base material of chassis 70 to be an existing PCB material. The most common base materials contain epoxy resins and fiberglass reinforcement. It may be desirable for chassis 70 to be of laminar construction to integrate and protect the electronic circuit components, as well as to maintain a flush surface, parallel with bottom surface 35 of can 34.

Figure 4A:
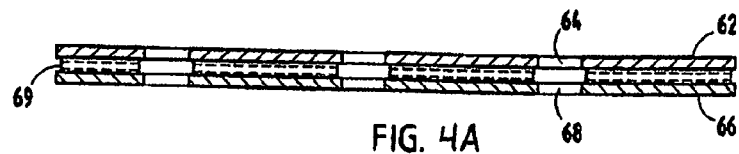
FIGS. 4A and 4B are partial cross-sectional views illustrating the valve of the air regulating system in open and closed positions.
Figure 4B:
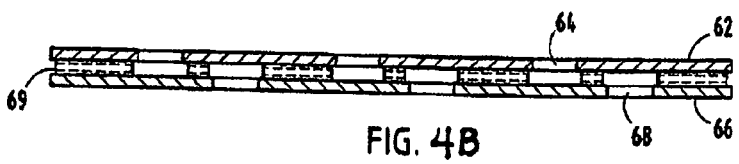

In the embodiment shown in FIGS. 3 and 4, the actuator further includes a plurality of shape memory alloy (SMA) components that particularly include a first SMA wire 82a and second SMA wire 82b. The SMA wires are secured at either end of the chassis 70 and are electrically coupled to tracings that extend from control circuit 90. By supplying a control signal that passes a current through SMA wires 82a and 82b, the control circuit 90 may cause the SMA wires to heat up, which causes the SMA wires to expand or constrict to a particular length. This in turn causes the SMA wires 82a and 82b to pull second plate 66 in one direction or opposite direction and thus causes plate 66 to slide in and out of an open or closed position so as to selectively allow fluid (i.e., air) to pass into the interior of cell housing 30.

Two contact terminals 92 and 94 are provided on chassis 70 for connection to the positive and negative terminals of cell 20. The contact terminals 92 and 94 may be provided on any surface of chassis 70, and it may be preferable to provide one of the contact terminals, particularly terminal 94, on an outer facing edge surface of chassis 70 such that it may be exposed to the outside of the battery assembly for subsequent connection to the cover 36 of cell 20. Contact terminal 92, on the other hand, may best be provided on an inner surface that is either pressed into electrical contact with a conductive portion of lid 100 or on the opposite surface in electrical connection with the bottom surface 35 of can 34. Electrical connections of contact terminals 92 and 94 can made to can 34 and cover 36 of cell 20, such as with an electrical conductor 110, extending from the contact terminal 94, around the outside of the side wall of the can 34 to the cover 37. The electrical conductor 110 can be a tab that includes a foil strip disposed between two insulating layers that prevent short circuiting between the cell housing 30 and the conductive foil.

As shown in FIG. 3, air regulating system 50 may further include a lid or cover 100 extending over and optionally around chassis 70 to protect and shield air regulating system 50. Lid 100 preferably includes one or more holes 102 to allow air to pass from the outside to valve 60 for selective passage into cell 20. As mentioned above, lid 100 may serve as first plate 62.

Preferably valve 60 is in an open condition when a current is applied indicating that cell 20 is in use, and is closed when a current is not applied indicating that the cell is not in use. Preferably the SMA wires 82a and 82b pull but do not push the second valve plate 66. Thus, in FIGS. 3 and 12 first SMA wire 82a pulls the valve open, whereas second SMA wire 82b pulls the valve closed. One or more wires 82a are utilized to pull valve plate 66 in one direction, while one or more other wires 82b are used pull the plate in the opposite direction. The SMA wires 82 may be disposed in a symmetric fashion about a center point of the valve plate 66 so as to supply an even force to prevent plate 66 from binding within chassis 70. In general, when the current applied to the SMA wires is provided from the cell it can be advantageous for current to be applied only to initiate movement of the actuator and not while the actuator is in a static condition in order to prevent unnecessary use of cell capacity. The SMA wires may be mounted to extend parallel to the direction in which plate 66 moves (as in FIG. 3) or perpendicular to the direction in which plate 66 moves (see FIG. 5).

SMA wires may be made with a conventional shape metal alloy. A shape memory alloy is an alloy that can be deformed at one temperature but when heated or cooled returns to its previous shape. This property results from a solid phase transformation, between the Martensite and Austenite phases. Preferred shape memory alloys have a two-way shape memory; i.e., the transformation is reversible, upon both heating and cooling. Examples of shape memory alloys include nickel-titanium, nickel-titanium-copper, copper-zinc-aluminum and copper-aluminum-nickel alloys, with nickel-titanium and nickel-titanium-copper being preferred. The use of nickel-titanium-copper (e.g., with about 5-10 weight percent copper) can be advantageous for actuators that may be operated many times because of its resistance to fatigue. Manufacturers of nickel-titanium and other shape memory alloys include Specialty Metals, Shaped Memory Alloy Division (New Hartford, N.Y., USA), Memry Corporation (Bethel, Conn., USA), and Dynalloy, Inc. (Mesa, Calif., USA).

The chassis 70 is shown having control circuit 90 and circuit traces formed on the top surface of the chassis body 72. Additionally, the SMA wires 82a and 82b are attached to a top surface of the chassis 70 in electrical contact with the circuit traces. The chassis 70 can have an overmold body 300 (FIG. 5) formed over the control circuit 90 and circuit traces so as to encapsulate and protect the components provided on chassis 70. Thus, the overmold body 300 serves as part of the chassis 70. The overmold body 300 may include a non-conductive epoxy or other overmolding material. Additionally, the overmold body 300 can include integrally formed ribs 302 which extend across the opening 74 above moving plate 66.

Figure 5:
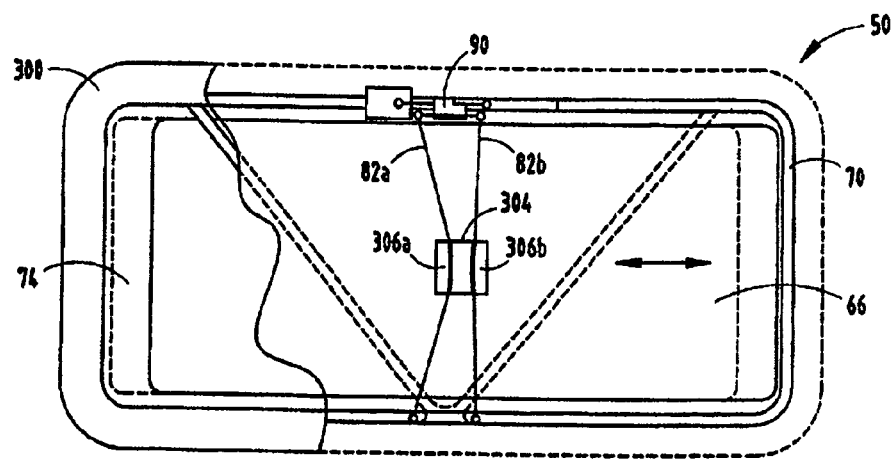
FIG. 5 is a top view of an air regulating system employing an actuator pin.

In the embodiment shown in FIG. 5, an actuator pin 304 is shown employed in an air regulating system 50. Pin 304 is shown including first and second portions 306a and 306b that are elevated above the remainder of the generally rectangular pin 304 such that the SMA wire 82a engages portion 306a and SMA wire 82b engages portion 306b. Portions 306a and 306b may include upstanding members as shown. Alternately, portions 306a and 306b may include slots formed within a pin or other structure 304. Accordingly, single or multiple actuator engagement structures may be employed to allow the SMA wires 82a and 82b to actuate the moving plate 66 in either direction to open and close the valve.

Figure 6:
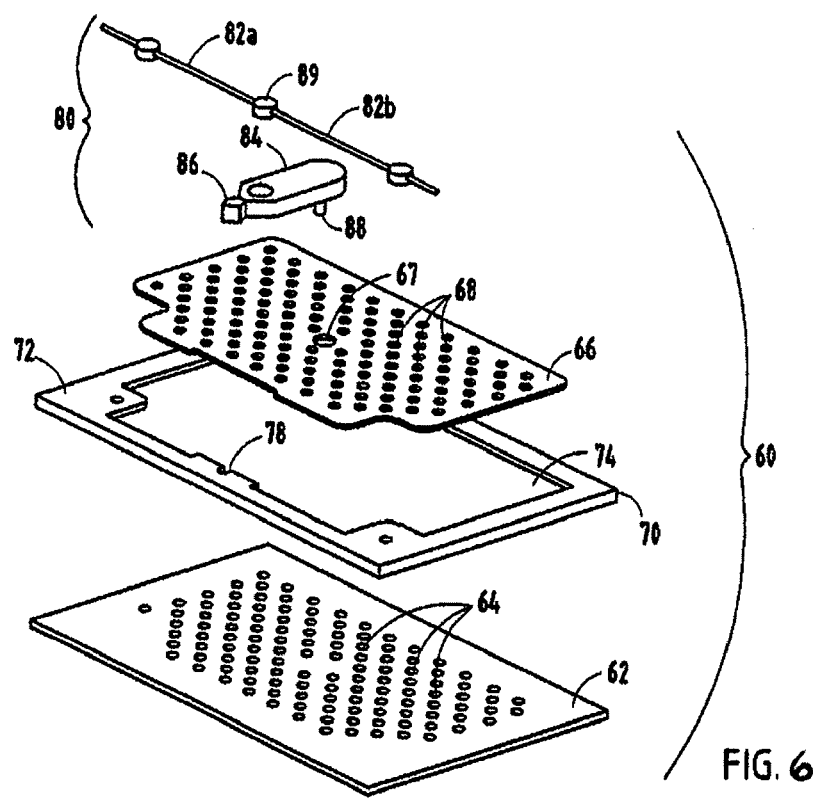
FIG. 6 is an alternative construction of an air regulating system that may be used in the various embodiments of the present invention.

FIG. 6 shows another embodiment of valve 60 that may be utilized in various embodiments of the present invention. Valve 60 includes first plate 62 including a plurality of apertures 64. Plate 62 may be a separate plate that is held stationary relative to chassis 70 or may be a portion of the can or cover of a cell housing 30. Plate 62 may be made of metal, which may be magnetic or non-magnetic. Valve 60 further includes second plate 66 including a plurality of apertures 68 that correspond in number, size, shape, and position to apertures 64 in first plate 62. Plate 66 may be a magnetic or non-magnetic metal. Similar to the embodiments discussed above, a chassis 70, which preferably is made of an electrically non-conductive material, includes an annular body 72 with a central opening 74 for receiving plate 66. Opening 74 is configured to be slightly larger than plate 66 in one direction so as to enable plate 66 to slide linearly relative to plate 62 such that apertures 64 and 68 may be moved into and out of alignment to open and close valve 60. The implementation shown in FIG. 6 differs from the implementations discussed above insofar as a lever arm 84 is utilized as a part of actuator 80. Lever arm 84 includes a pivot pin 86 that is received in an aperture or a slot or recess 78 formed in chassis 70 such that lever arm 84 may be pivotably secured to chassis 70. This may be done, for example, by enlarging and reshaping the recess 78 to fit around pivot pin 86 and partially extend into the necked area between the pivot pin 86 and the body of lever arm 84 in such a way as to capture pivot pin 86 within the recess 78 but still allow the lever arm 84 to pivot within the recess 78. Other means of securing the pivot pin 86 to the chassis may be used, such as a downward projection from pivot pin 86 that is received in a hole in a ledge at the bottom of the recess 78. An actuator pin 88 preferably extends downward from the body of lever arm 84 such that it may be received in a hole 67 formed in second plate 66. This allows lever arm 84 to engage plate 66 and thus to slide second plate 66 relative to first plate 62. In this particular configuration, a pair of SMA wires 82a and 82b is attached via an attachment point 89 to a top surface of lever arm 84. The other ends of wires 82a and 82b may be attached to chassis 70. Wires 82a and 82b can be secured to recesses in the chassis, similar to recess 78, for example. They can be secured in any suitable manner, such as with adhesives, with pins or by fitting enlarged heads into recesses with restricted openings. Alternatively, the lever arm 84 can be made of the same material as, and integrally formed as a part of, chassis 70, with a narrow section that functions as a flexible hinge.

The SMA wires are electrically coupled to a control circuit (not shown in FIG. 6) that selectively applies a current to SMA wires 82a and 82b in response to a sensed cell voltage. In this manner, SMA wires 82a and 82b may pull the lever arm in either of two opposing directions thus causing lever arm 84 to slide second plate 66 relative to first plate 62. In this case, chassis 70 serves as a mounting location for the pivot point of lever arm 84 and of the ends of SMA wires 82 while also providing a guide for guiding plate 66 relative to plate 62. Other arrangements of SMA wires and levers can be used to operate a valve in an air regulating system, and SMA wires can be connected to components of an air regulating system in any suitable manner.

In embodiments in which a control circuit is used to restrict the flow of current through the SMA wire(s) to only the time required to move the valve to an open or closed position, the SMA wires can return to their original length (e.g., elongate) after the current flow is stopped. When this happens, the SMA wires may not hold the plate in the desired position, allowing it to slide to a partially open or partially closed position, for example. This is particularly true when there is an opposing SMA wire for moving the sliding plate to another position; elastic tension from the unactuated opposing SMA can pull the sliding valve as the actuated SMA elongates following the cessation of current. In such situations, the sliding plate can be held in the desired position until the plate is intentionally moved from that position. An example of a means of retaining the sliding plate in a desired position is a latching mechanism. Any suitable mechanism can be used. In one embodiment a spring biased detent can cooperate with a projection from or a recess in a surface of the sliding plate. The spring force can be selected to be sufficient to keep the plate from sliding unintentionally but weak enough to be easily overcome by the action of an opposing SMA wire to slide the plate into another desired position.

In another embodiment the sliding plate is kept from sliding unintentionally by friction between the sliding plate and another cell or air regulating system component functioning as a stationary plate. The friction between the plate and the other component is sufficient to prevent unintentional sliding but not so great as to interfere with the efficient movement to another position by action of an opposing SMA. The friction can be controlled through the selection of materials for the moving plate and the other component, the film or coating applied to one or both or the moving plate and the other component, the type of sealing fluid used between the plate and the other component, or the texturing of one or both of the adjacent surfaces.

The air regulating system 50 may be secured to the exterior of cell 20 using a variety of techniques that are discussed below. As shown in FIG. 7, lid 100 may be configured to have a plurality of stand-offs 104 that extend downward from an inner surface of lid 100 and then pass through holes 75 in corresponding locations on chassis 70 such that the stand-offs 104 may be attached to bottom 35 of can 34. In FIG. 8, a configuration is shown whereby the lid 100 is formed of plastic. In this case, the stand-offs 104 may be ultrasonically welded to the bottom surface of can 34. In this case, there would be no electrical connection between the lid 100 and can 34. In another configuration, the stand-offs 104 are provided as an indentation/protrusion 106 in a metal lid 100 which may be formed by stamping or the like. In this case, the metal lid 100 may be resistance- or laser-welded to the bottom surface 35 of can 34. In yet another configuration, vias 105 are provided through the holes 75 of chassis 70 which serve to weld lid 100 to can 34. This weld also provides an electrical connection between lid 100 and cell 20.

Other techniques can be used to secure a metal lid 100 to can 34, such as with a conductive epoxy 107 that is provided in the holes 75 of chassis 70, an adhesive, a combination of an adhesive and a label, a press fit of the chassis into one or more grooves coined in the bottom surface of can 34, by a press fit of the chassis in combination with an adhesive, by crimping can 34 within a second can where the outermost can replaces lid 100, by soldering or welding a laminar chassis, or by encapsulating the air regulating system 50 in an epoxy.

Although the use of SMA wires has been described above as being a preferred component of actuator 80, other components or materials may also be utilized, such as linear electrode-active polymers and bending electro-active polymers, which are associated with artificial muscles. Such materials offer potential advantages including a simpler design, no or simplified electronics, and a proportional response to voltage.

Another consideration relates to the initial activation of the battery. The battery may be built with the valve in the open position and with holes 102 protected by a tab similar to conventional button air cells. Air-up after removal of the tab would activate the cell, initiate electronic control of the valve, and maximize the shelf life of the battery. Alternatively, the battery could be built with a functioning air regulating system. This would allow the battery to be immediately useable by the consumer but may also require suitable packaging and storage conditions in the warehouse, store shelves, etc. to prevent moisture ingress in humid environments and moisture egress in dry environments.

In the construction discussed above, the can 34 may act as the stationary plate 62 of valve 60. However, it may be desirable to provide a separate fixed plate 62 rather than utilizing can 34 such that the can bottom will maintain its hole pattern, but may act more like an air diffuser rather than an integral part of the valve assembly. In addition, the stationary plate 62 may be spaced apart from the can bottom such that if the can 34 bulges, bows, or possibly wrinkles, it will not disrupt the operation of the valve 60. It should be noted that the can 34 may be made with a stronger material, a greater thickness, or a different shape (e.g., ridges in the bottom). An additional advantage of utilizing a separate stationary plate 62 is that the valve 60 may be totally preassembled thus providing a greater stability of the lubricating fluid layer 69. This may come, however, at the cost of a thicker battery.

Although not illustrated in the drawing figures, a label may be provided to the outer surface of cell housing 30. Such a label may extend around the perimeter of the cell so as to further cover the electrical conductor tab 110 as well as the interfaces between the air regulating system 50 and cell 20 and to cover the interface between the can 34 and cover 36. Sufficient portions of the cover 36 and the can 34 and/or a conductive lid 100 could remain exposed to provide electrical contact terminals on the outside of the battery.

The particular cell construction illustrated in FIGS. 1-3 is a prismatic cell design. The construction differs from a conventional button type air cell in the relative size and rectangular nature of this cell. Similar air electrodes, anodes, separators and can/cover materials may thus be utilized in cell 20 that are presently used in conventional air cells. It should be appreciated by those skilled in the art, however, that the cell 20 need not have the particular shape, size, or relative dimensions as those shown in the drawings.

Figure 9:
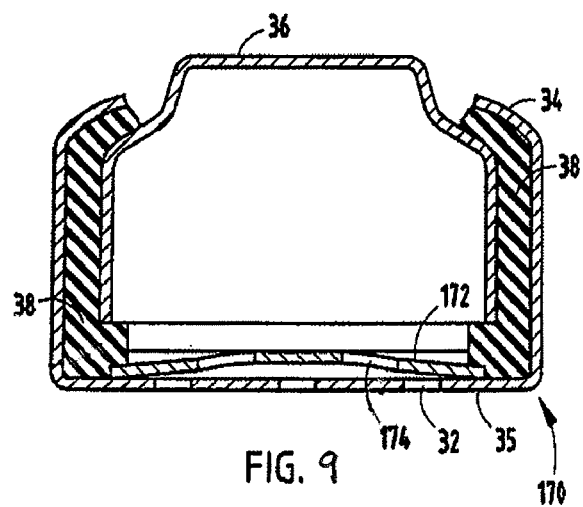
FIG. 9 is a cross-sectional view of a battery constructed in accordance with an embodiment of the present invention.

FIGS. 9-12 show another embodiment of the present invention. According to this embodiment, a different type of valve 170 is used in an internally mounted air regulating system. The valve 170 includes a valve plate 172 having a plurality of apertures 174. These apertures, however, are not necessarily sized, shaped and positioned to correspond to air entry ports 32 in the bottom of can 34. This is because valve plate 172 is moved between a relative parallel relation with the bottom surface 35 of can 34 (the valve closed position) and a bowed/flexed position as shown in FIG. 9 (the valve open position). In this construction, the apertures 174 in plate 172 do not line up or overlap with any of air entry ports 32 so that no air may pass into the cell when plate 172 is parallel to the bottom 35 of can 34. To ensure plate 172 is sufficiently pressed against the inner surface of can 34 to seal the cell in a closed position, gasket 38 presses the peripheral edges of plate 172 against can 34. The seal provided by the sealing medium when the valve 170 is closed is broken when valve plate 172 is moved to an open position, such that a pathway, unobstructed by the fluid of the sealing medium, is created for the flow of air between the air entry ports 32 in the can 34 and the apertures 174 in plate 172.

Figure 10:
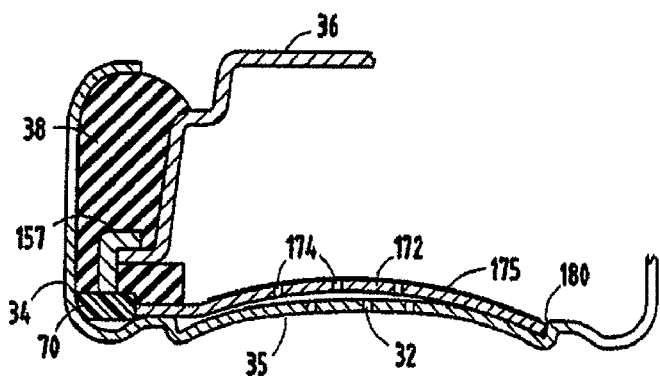
FIG. 10 is a cross-sectional view of a battery constructed in accordance with an embodiment of the present invention.
Figure 11:
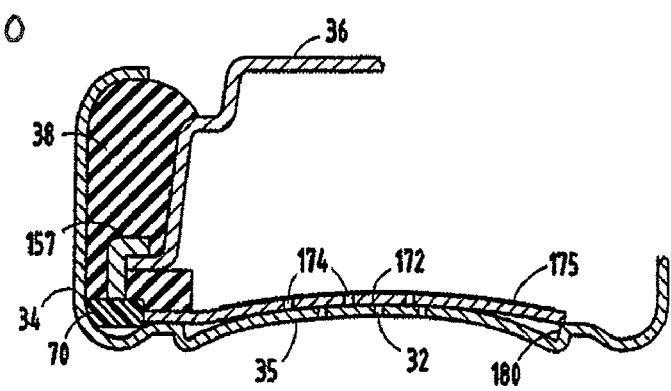
FIG. 11 is a partial cross-sectional view of a portion of the battery shown in FIG. 10, but with the valve in a closed position.
Figure 12:
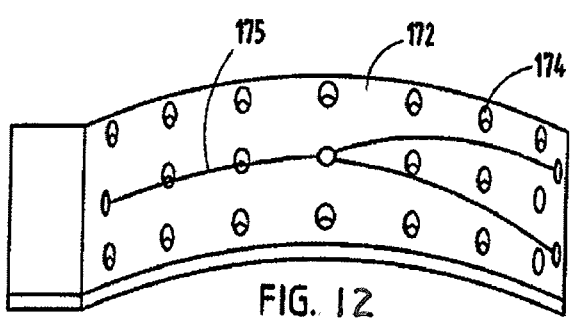
FIG. 12 is a perspective view of a valve member useful in the battery shown in FIG. 10.
Figure 13:
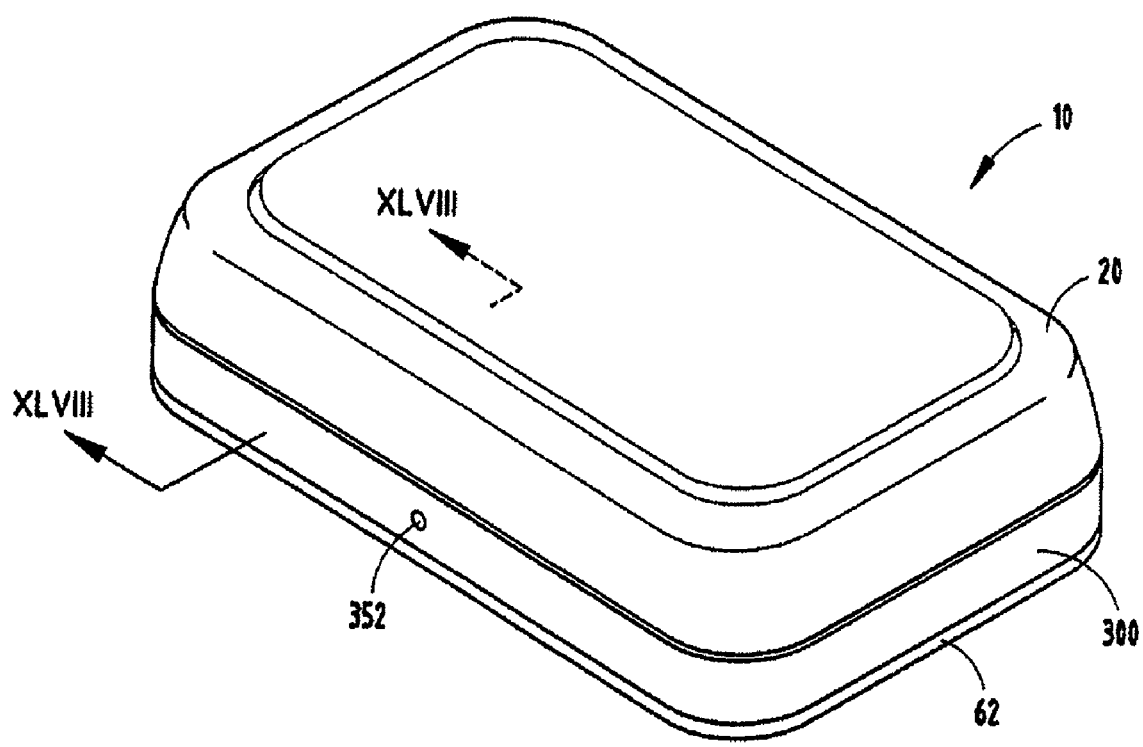
FIG. 13 is a perspective view of a battery having an air regulating system with a pressure release air passage path provided in the chassis.
Figure 14:
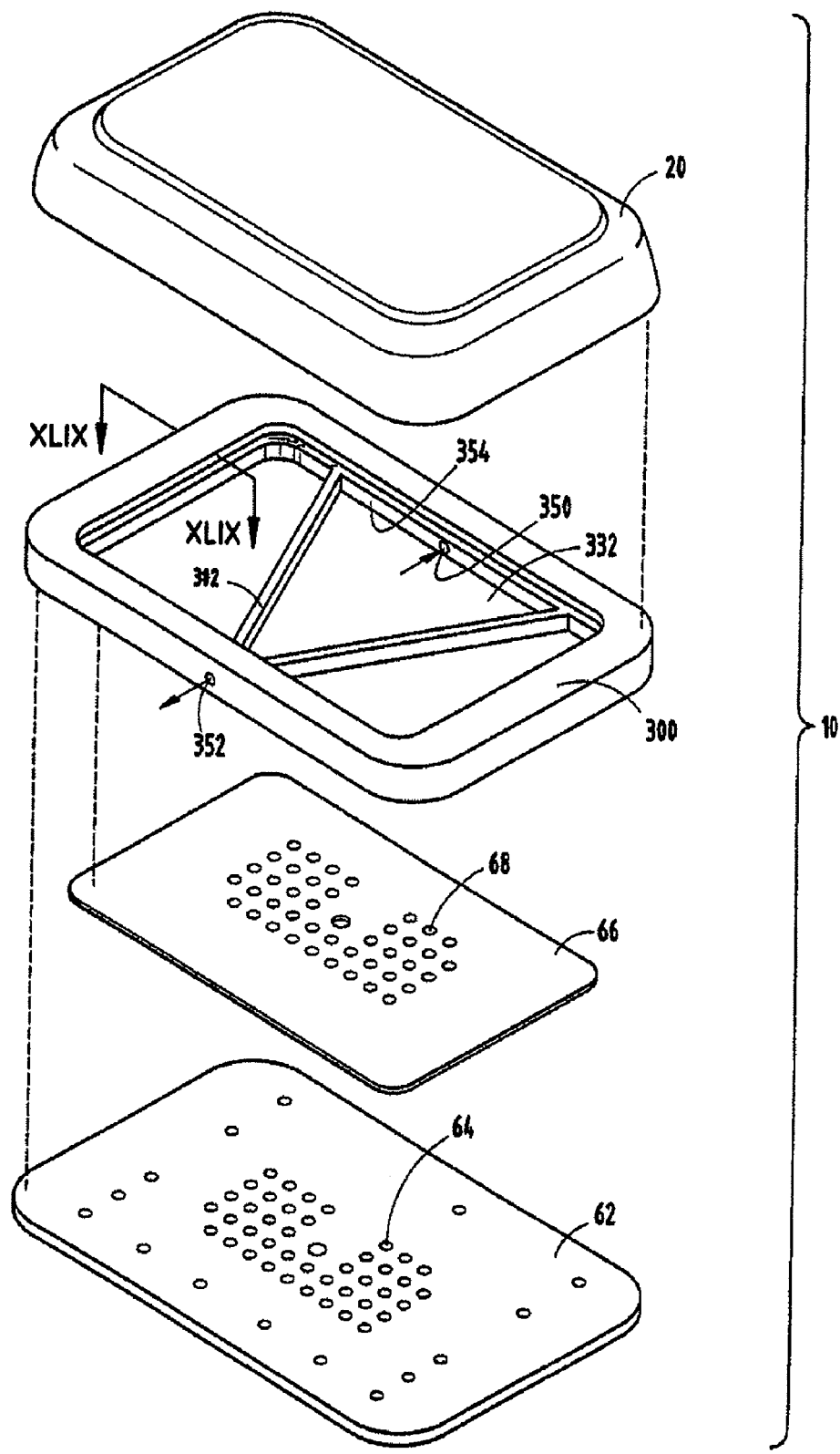
FIG. 14 is an exploded perspective view of the battery having an air regulating system with a pressure release path shown in FIG. 13.
Figure 15:
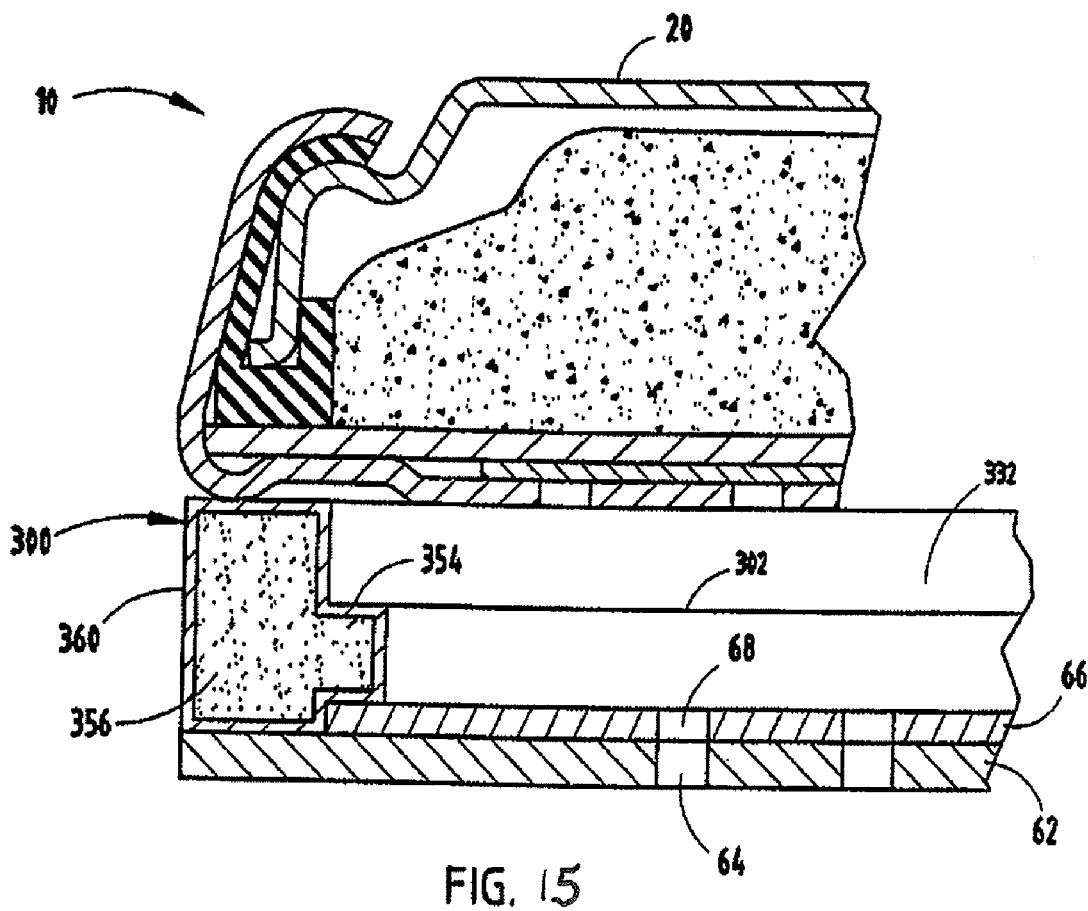
FIG. 15 is a cross-sectional view of a portion of the battery and air regulating system taken through lines XLVIII-XLVIII of FIG. 13.

As shown in FIGS. 10 and 11, an alternative construction that utilizes a valve plate 172 secured at only one end under gasket 38 and having a latch 180 formed in can bottom 34. FIG. 10 shows the valve in an open position while FIG. 11 shows the valve in a closed position. FIG. 12 shows a perspective view of plate 172 with a SMA actuator 175 secured to plate 172 so as to cause plate 172 to lift and/or flex into the open position. The movement of plate 172 in the open position may be restricted by the air electrode (not shown). In one embodiment of a construction with a flexing plate 172, an electrically conductive pin 157 can be used to make electrical contact between the cover 36 and the contact terminal 94 through the gasket 38, as shown in FIGS. 10 and 11.

Referring to FIGS. 13-17, a gas consuming battery 10 is shown having a battery cell 20 and an air regulating system 50 having an air passage through the chassis body 300 that provides for pressure equalization between the cell 20 and the outside environment, according to two embodiments. In the embodiments shown, a chassis is generally illustrated by the overmold body 300 having a central opening 332 and an inward extending ledge 354. A gas consuming battery cell 20, such as an air cell, is connected on the top surface of the chassis 300. The fixed plate 62 with air entry ports 64 is connected to the bottom surface of chassis 300 and moving plate 66 with ports 68 is disposed between the lower wall of inward extending ledge 354 and fixed plate 62 so that plate 66 may be moved relative to plate 62.

In the embodiment shown in FIGS. 13-16, the overmold chassis body 300 is generally illustrated having a first port, also referred to as an inlet 350, located generally between the cell 20 and the moving plate 66, and in fluid communication with opening 332 and cell 20. The chassis body 300 also has a second port, also referred to as an outlet 352, provided on the outside of the overmolded material leading to the outside environment. The overmolded chassis 300 is manufactured to have a nonporous outside layer 360 and a porous internal volume that provides the air passage 356. The nonporous outside layer 360 is generally non-permeable to air and may include an epoxy, according to one example. The porous internal volume provides for a pressure equalization air flow passage 356 that extends from the inlet 350 to the outlet 352. The porous internal volume may include an air permeable material, such as microporous polytetrafluoroethylene material, or a non-woven porous material that allows restricted air flow at a low diffusion rate through the passage 356. Alternatively, or in addition, the air passage 356 may include empty void volume providing a sufficiently restricted passage that allows air flow at a low diffusion rate. The air passage 356 advantageously allows air to slowly pass from the inlet 350 to outlet 352, however, the air passage 356 may allow air or gases to pass in either direction between the inlet 350 and outlet 352 to provide pressure equalization between the cell 20 and the outside ambient environment.

The inlet 350 of air passage 356 is in fluid communication with the open volume between the battery cell 20 and valve plates 66 and 62. A pressure differential existing between gases within the battery cell 20 and outside environment may allow gas to migrate through the air passage 356. When the battery cell 20 generates gas, the gas may migrate through the restricted air passage 356 to the outside environment to prevent compromising the seal between the valve plates 66 and 62. Contrarily, gas may be permitted to flow from the outlet 352 to the inlet 350, but is generally restricted such that air is not freely supplied to the battery cell 20 so that the cell 20 is generally not discharged at a high rate when the valve is closed.

Figure 16:
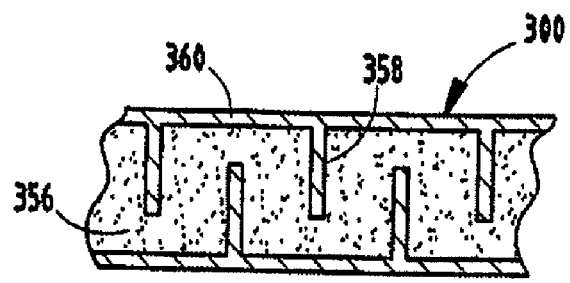
FIG. 16 is a cross-sectional view of the chassis taken through lines XLIX-XLIX of FIG. 14 illustrating baffles forming a tortuous fluid passage.

According to one embodiment, the air passage 356 has an air diffusion rate that would result in a loss of no more than 10 percent of the cell capacity per year at room temperature due to moisture gain or loss. It should be appreciated that the porous volume of the air passage 356 may include a membrane that is generally porous to gases to provide a tortuous or restricted air flow passage, but does not allow free unrestricted flow of air into the cell 20. According to one embodiment, the porous volume 356 may include a tortuous air passage 356, such as that provided by baffles 358 as shown in FIG. 16. The baffles 358 essentially increase the effective length of the air flow passage 356 through the overmolded chassis 300, thus increasing the net effective air flow path length. According to other embodiments, the tortuous air flow path may employ a honeycomb pattern that is generally porous to allow excess gas to escape from the cell 20 to the outside environment, while minimizing the amount of air from entering the cell 20.

Figure 17:
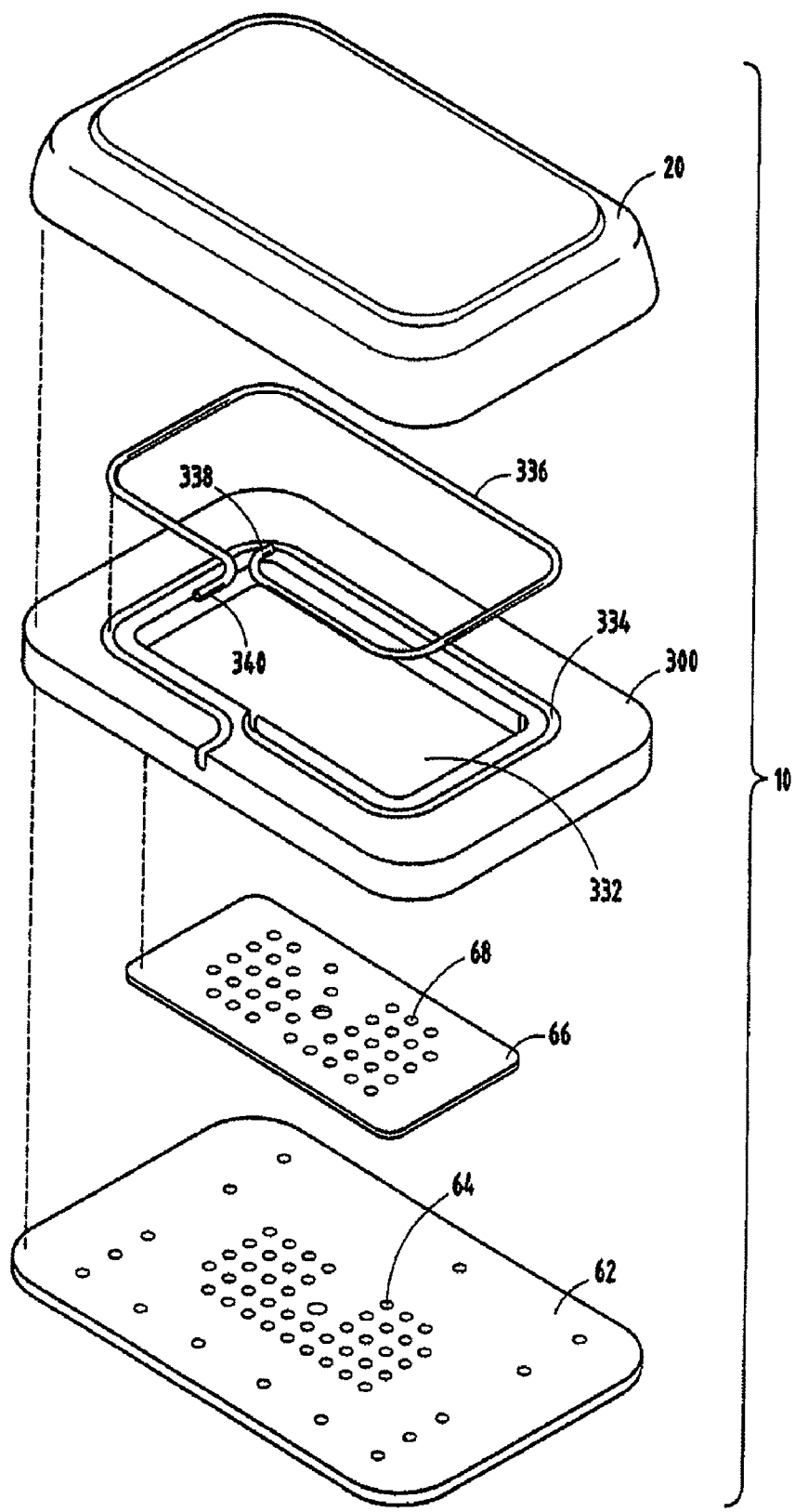
FIG. 17 is an exploded perspective view of a battery having an air regulating system with a pressure relief fluid path, according to another embodiment.

In the embodiment shown in FIG. 17, the top surface of the overmold chassis body 300 has a slot 334 formed therein in a generally serpentine shape that extends from the inside opening 332 in a rectangular shape about the opening 332 by about 360° leading to the outside surface of the chassis 300. Disposed within the slot 334 is a hollow tube 336 having a general configuration adapted to be sized and fit within slot 334. The tube 336 has a first port, also referred to as an inlet 338, at one end in fluid communication with the inside opening 332 of the chassis 300 and cell 20, and has a second port, also referred to as an outlet 340, at the other end in fluid communication with the outside environment. The fixed plate 62 is shown connected on the bottom surface of chassis 300. The moving plate 66 is disposed below ledge 354 and is adjacent to and in sealed relationship with the fixed plate 62, such that plate 66 is moveable relative to plate 62 to open and close the valve.

The tube 336 provided within chassis 300 provides an air passage that extends between the inlet 338 and outlet 340 such that gas released from the battery cell 20 is able to pass through the air passage of tube 336 to the outside environment. The inlet 338 is located in position in the volume of opening 332 between the battery cell 20 and the fixed and moving plates 62 and 66, according to one embodiment. Thus, the extended length and small diameter of tube 336 provides a tortuous air passage that allows gas to escape from the cell 20 at a sufficiently low diffusion rate, while sufficiently restricting air ingress to the cell 20 due to the low diffusion rate. In one embodiment, tube 336 has a sufficiently restricted inner diameter of less than 0.5 mm and an effective length of at least 200 mm. According to another embodiment, the slot 334 may be covered and utilized as the air passage in lieu of use of the tube 336.

In the disclosed embodiments of FIGS. 13-17, a pressure differential existing between the gases within the battery cell 20 and the ambient outside environment in which the cell 20 is exposed may cause a disruption, which may lead to subsequent failure of the seal barrier. Thus, the intended primary seal barrier between the valve plates 62 and 66 can be compromised, which would potentially allow uncontrolled ingress and egress of gas, such as water, oxygen, hydrogen, and carbon dioxide, which could result in the unacceptable loss of battery shelf-life. The pressure equalization air passage 336 or 356 provided in chassis 300 allows air and other gases to migrate through the air passage to egress and ingress. By providing an appropriately sized hole of a suitable length, the air passage allows for the egress of gas, such as hydrogen generated within a metal-air cell, while prohibiting excess ingress of oxygen and carbon dioxide to the cell 20.

Figure 18:
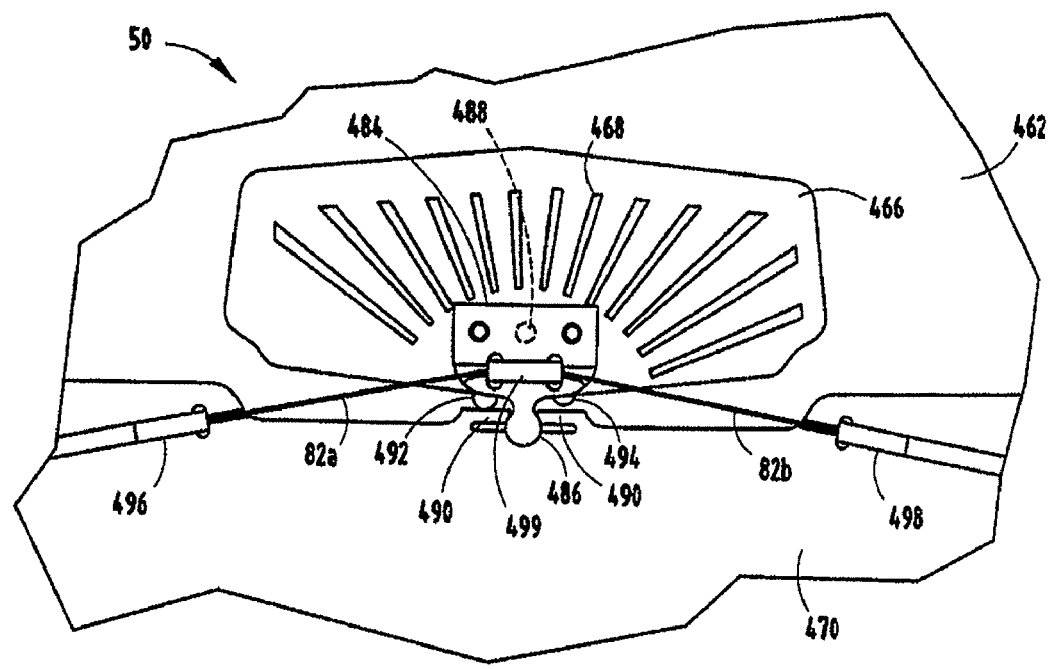
FIG. 18 is a top view of an air regulating system employing a rotational moving plate in the open valve position.
Figure 19:
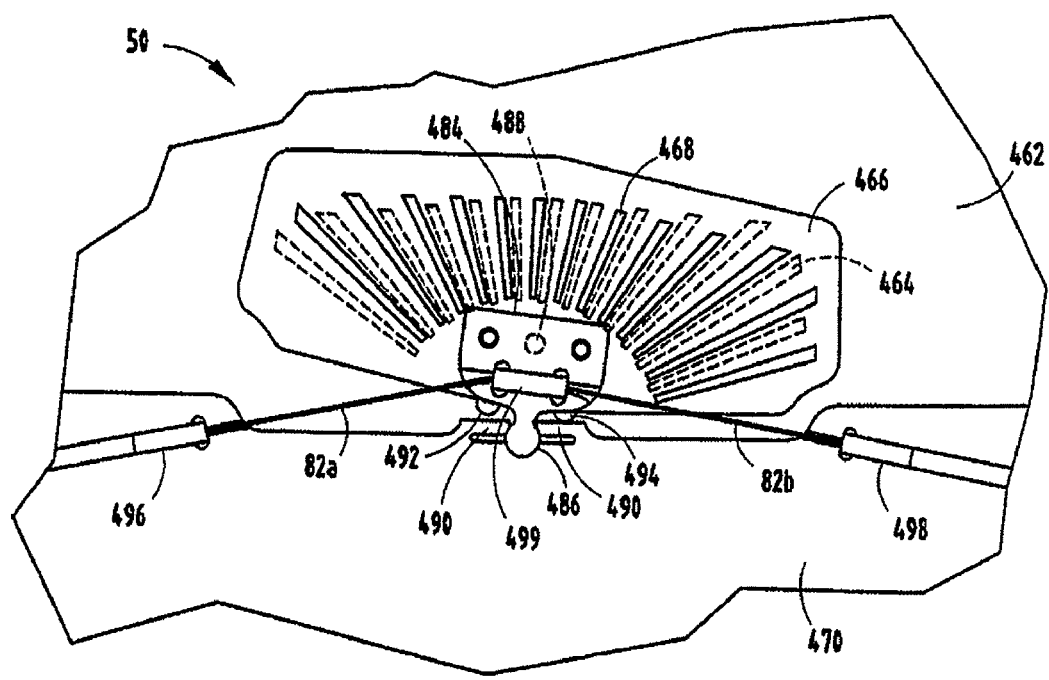
FIG. 19 is a top view of the air regulating system of FIG. 18 shown in the closed valve position.

Referring to FIGS. 18 and 19, an air regulating system 50 is generally illustrated having a rotatable plate valve assembly. In this embodiment, a lever 484 is shown connected to a rotatable plate 466 having generally tapered slot openings 468, though other shapes can be used. Below the rotatable plate 466 is a stationary plate 462 which likewise includes slot openings 464 (either tapered or having other shapes) that may align with the openings 468 in the open valve position to allow air entry into a battery cell (not shown). With plate 462 fixed, rotatable plate 466 rotates clockwise and counterclockwise to close and open the valve The lever 484 is shown having a pivoting hip 486 generally disposed within a frame plate, such as the chassis 470. The lever hip 486 can be generally round in shape and is engaged within the frame plate 470 by way of resilient arms 490. Arms 490 can help to hold the round hip 486 in place to provide a low degree of variability in the location of actuator pin 488, thereby providing low variability in alignment of openings 464 and 468. The hip 486 allows lever 484 to rotate from a counterclockwise position with one shoulder 492 in contact with plate 470 as seen in FIG. 18 into a position with the other shoulder 494 in contact with plate 470 as seen in FIG. 19 in response to actuation provided by SMA wires 82a and 82b. Shoulders 492 and 494 serve as end of travel stops and may be omitted in other embodiments. The SMA wires 82a and 82b are shown connected to the frame plate 470 by way of a pair of crimps 496 and 498, and are further connected together within lever 484 via another crimp 499. It should be appreciated that the crimp 499 may include an electrical ground path or the ground path may be provided through an alternative conductive path.

In operation, the air regulating system 50 of the embodiment in FIGS. 18 and 19 is actuated by electrically energizing one of the SMA wires 82a or 82b to rotate lever 484 to move plate 466 between open and closed valve positions. It should be appreciated that the slots 464 and 468 provide gearing of the actuation from SMA wires 82a and 82b following the increase in stroke as the radius from the hip 486 increases.

The rotational valves illustrated in FIGS. 18 and 19 provide for rotation of the moveable plate relative to the stationary plate. It should be appreciated that, alternately, linear actuation of the plate may be achieved or a combination of linear movement and rotation movement of the moving plate relative to the stationary plate may be achieved, according to other embodiments. Further, while the valve has been described in connection with a moving plate and a stationary plate, it should be appreciated that the valve may include one or two moving plates, such that one plate moves relative to the other plate to open and close the valve.

Referring to FIGS. 20-23, an air regulating system 50 is illustrated having a sealing medium 502 including round members 500 disposed between the fixed and moving valve plates 62 and 66, according to one embodiment. In this embodiment, the air regulating system 50 is shown including a chassis 70 having an annular body portion 72, an inward extending ledge 71 and an opening 74 in which the moving valve plate 66 is disposed. The inward extending ledge 71 is shaped and sized to contact the peripheral elongated upper side edges of moving valve plate 66 while providing excess space at the shorter side of the plate 66 so that it may slide linearly along an axis parallel with its longest dimension. Connected to the bottom side surface of chassis 70 is the fixed valve plate 62. The fixed valve plate 62 may be adhered, fastened, or otherwise connected to the bottom surface of chassis 70.

Moving plate 66 has a plurality of apertures 68 that align with a plurality of apertures 64 in fixed plate 62, when the valve is in the open position. Plate 66 is slidable within opening 74 of chassis 70 to move between the open and closed valve positions. When in the closed valve position, the apertures 68 and 64 are not aligned such as to prevent air from passing through apertures 64 and 68 and reaching a gas consuming battery cell. It should be appreciated that a gas consuming battery cell may be attached to the top surface of the chassis 70 similar to the assembly of battery cell 20 on chassis 300 shown in FIGS. 14 and 15 with one or more air entry ports of the battery cell 20 in fluid communication with the valve to receive air (e.g., oxygen).

The air regulating system 50 includes a sealing medium 502 disposed between the moving valve plate 66 and the fixed valve plate 62. The sealing medium 502 includes a plurality of round members, shown and described in an exemplary embodiment as spherical members 500. The round members can have other shapes, such as generally straight or tapered cylinders. The spherical members 500 are disposed within the fluid layer 69 and serve to enable the moving valve plate 66 to more readily slide relative to the fixed valve plate 62. Thus, the sealing medium 502 enables the valve plates to move relative to each other to open and close the valve in a manner that requires less force by the actuators which are shown as SMA components 82a and 82b according to one embodiment. Additionally, the spherical members 500 serve to provide a controlled standoff height to maintain a minimum separation distance between the moving plate 66 and fixed plate 62.

The fluid in the fluid layer 69 serves both as a seal to prevent air leakage through the valve and as a lubricant to reduce friction. It should be appreciated that the use of the fluid enhances the sealing characteristic of the valve without requiring complex and expensive machinery of the valve plates 62 and 66 to otherwise provide a good seal. The controlled height gap maintained by the spherical members 500 provides a fixed distance between the sliding plate 66 and stationary plate 62 to further help control the leak rate and thickness of the fluid. As described in previous embodiments, the sealing medium 502 also includes a film or coating of porous material (not shown) on the interfacial surface of one or both plates 62 and 66 to retain the fluid and maintain fluid layer 69 between the plates 62 and 66 over a period of time.

Figure 20:
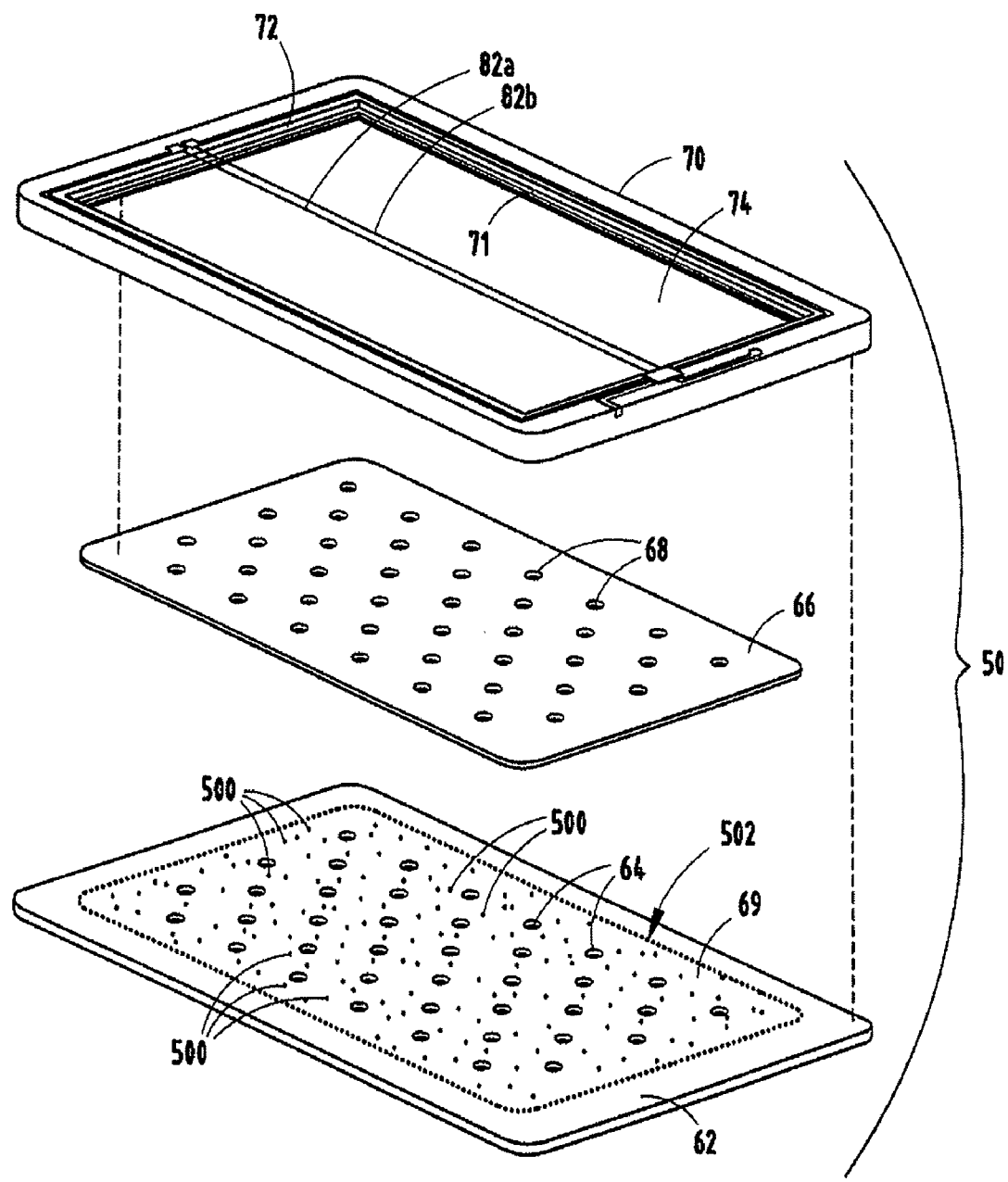
FIG. 20 is an exploded view of an air regulating system having a sealing medium including spherical members disposed between the valve plates.
Figure 21:
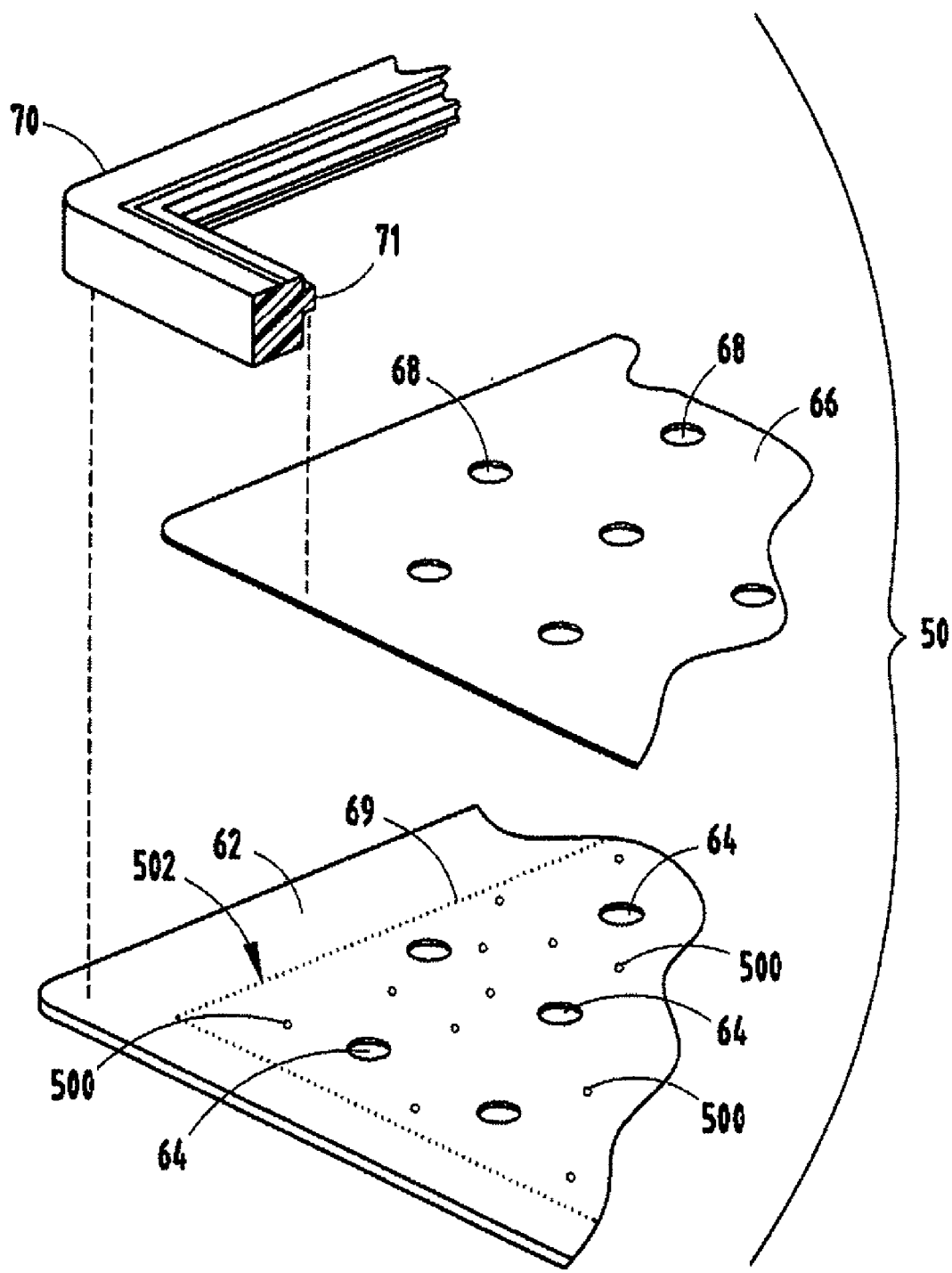
FIG. 21 is an enlarged exploded view of a portion of the air regulating system shown in FIG. 20, illustrating the sealing medium.

The sealing medium 502 is shown in FIGS. 20 and 21 applied on top of the fixed valve plate 62. However, it should be appreciated that the sealing medium 502 may be applied to the top surface of the fixed plate 62, the bottom surface of the moving plate 66, or to both surfaces during the assembly of the air regulating valve. As seen, the spherical members 500 are dispersed throughout the fluid layer 69 such that spherical members 500 are generally present in different regions of the interface area between the valve plates 62 and 66. The spherical members 500 may be randomly dispersed within the fluid layer 69 as shown, or may be positioned in a desired pattern.

The spherical members 500 can be made of any material that is relatively inert in the fluid and in the types of environments to which the battery is expected to be exposed. Examples of suitable materials include plastics such as polyethylene and polypropylene, glasses, ceramics and metals such as stainless steel. Preferred materials include polypropylene beams, ceramic beads, glass beads and stainless steel beads. It should be appreciated that other materials may be employed to form the round members 500 of the friction reduction medium 502 according to further embodiments. Preferably the round members 500 are uniform in size to provide the desired distance between plates 62 and 66 with a minimum amount of material.

With particular reference to FIGS. 22 and 23, the valve plates 66 and 62 of the air regulating system 50 are illustrated in the open valve position in FIG. 22 to allow air entry to a gas consuming battery cell, and in the closed valve position in FIG. 23 to prevent air entry to the cell. As seen in FIG. 22, with the movable plate 66 is slidably moved to the open position such that apertures 68 of plate 66 are aligned with apertures 64 of plate 62, fluid is allowed to pass through the air regulating device. The sealing medium 502 made up of the spherical members 500 disposed in the fluid layer 69, retained between the movable plate 66 and fixed plate 62 by a film or coating of material (not shown) on the interfacial surface of one or both of the plates 62 and 66. Due to the surface tension properties of the fluid, the fluid provides a seal, and the film or coating on the plate(s) helps to contain the fluid so the fluid remains disposed between the two valve plates 66 and 62 and such that the fluid does not flow through apertures 68 or 64.

By actuating the moving plate 66 to the closed position, as seen in FIG. 23, the apertures 68 and 64 are no longer aligned with each other such that air flow therethrough is prevented. Despite movement of moving plate 66 relative to fixed plate 62, the fluid will effectively stay out of the apertures 68 and 64 due to the surface tension and containment by the film or coating and will instead flow around the apertures 68 and 64 such that the fluid and spherical members 500 of the friction reduction medium remain located between non-open portions of valve plates 66 and 62. Thus, fluid also forms a seal between the plates 62 and 66 to prevent air leakage.

In the exemplary embodiment shown, the sealing medium, including particularly the spherical members 500, have a height H that provides a minimum standoff distance between moving plate 66 and fixed plate 62. The spherical members 500 may roll or rotate during movement of moving plate 66 and, thus, act as ball bearings to reduce friction and hence the force that is needed to actuate and move the moving plate 66. Accordingly, less battery energy is required to actuate the moving valve plate 66. The spherical members 500 also provide a minimum stand off distance between the two valve plates. The spherical members 500 prevent the gap between the plates 66 and 62 from continually decreasing, particularly as the valve is cycled. This can help prevent the loss of fluid and resultant degradation of the seal and increase in friction. The fluid further enhances the lubricating characteristics particularly with the spherical members 500 providing a controlled height incorporated into the sealing medium 502.

According to one embodiment, the spherical members 500 are formed as small spheres, also referred to as microspheres, having a diameter in the range of one micron to two hundred microns. In a more specific embodiment, the microspheres have a diameter of about 6-20 microns. In one embodiment, the amount of spherical members 500 disposed in the lubricating fluid is in the range of about one to ten percent by weight of the fluid.

According to one example, the fixed valve plate 66 has a thickness of about ten mils (254 microns), as compared to the fixed valve plate 62 having a thickness of about twenty mils (508 microns). In this example, the spherical members 500 of the sealing medium 502 have a diameter of about one third mil (8.5 microns). It should be appreciated that other size round members 500 may be employed in the sealing medium 502 between valve plates having various thicknesses.

While spherical members 500 are illustrated herein in accordance with the sealing medium 502, it should be appreciated that other round members 500 may be employed to provide friction reduction and standoff distance between the valve plates 66 and 62. For example, the round members 500 may include cylinders positioned to roll or rotate in the direction of movement of the moving plate 66 relative to fixed plate 62. Additionally, it should be appreciated that the round members 500 may be held in position relative to the valve plates 66 and 62 by disposing the round members 500 in shaped surface contours. According to one embodiment, detents such as in the form of semicircles, may be incorporated on either or both the top surface of the fixed plate 62 and the bottom surface of the moving plate 66. The detents would receive the round members 500 and retain the round members 500 at a particular location relative to one of the valve plates. According to another example, detents may be implemented as slots formed in either or both of the top surface of the fixed plate 62 and bottom surface of the moving plate 66 to maintain the position of one or more of the round members 500.

Accordingly, the sealing medium 502 employing the round members 500 advantageously reduces the friction between the movable plate 66 and fixed plate 62, such that less energy is required from the battery to power the actuator to activate the moving plate 66. Additionally, the round members 500 provide the standoff distance between the valve plates 62 and 66 to provide enhanced lubricating and sealing characteristics of the fluid by maintaining the proper distance to achieve enhanced valve operation. An enhanced air manager valve is thereby realized by employing the round members 500.

In order to adequately retain fluid within the sealing medium without creating a path through which air can leak, a suitable fluid containment layer be made from a porous material having an average pore size of from 0.03 to 15 micrometers, as determined by a bubble point method, such as described below, using a capillary flow porometer. Preferably the average pore size will be from 0.04 to 15 micrometers. It is more preferable that the average pore size is at least 10 micrometers. It is more preferable that the average pore size be less than 12 micrometers.

The air permeability of the porous polymeric material is preferably such that the Gurley air permeability value is from 3 to 500 seconds, as determined using a Gurley densometer according to the method described below.

The materials in the fluid containment layer and fluid interact so fluid is retained in the interface between the air regulating system plates when the battery is oriented such that the plates of the air regulating system are not horizontal. This fluid retention capability can be defined in terms of a maximum wicking height. Preferably, the maximum wicking height is equal to or greater than the maximum interfacial dimension of the plates. The method of determining the wicking height is described below, as is the method of calculating the maximum wicking height. Since the maximum wicking height is a function of the wicking height after a period of time, it is convenient to simply measure the wicking height at a relatively long time, such as 18 hours. A suitable fluid containment layer material can have a wicking height from 10 to 100 mm after 18 hours. Preferably, the wicking height after 18 hours is greater than 11 mm, and more preferably it is greater than 15 mm. Preferably the wicking height after 18 hours is no greater than 61 mm, and more preferably no greater than 50 mm.

EXAMPLE 1

A test fixture was used to evaluate the functioning of a sliding plate valve with a seal medium consisting of an oil layer between the stationary plate and the sliding plate of the valve. The fixture included an empty rectangular shaped can with the valve mounted across its open end. Both plates had apertures (holes) therethrough, and the plates were assembled in a closed position, with the holes misaligned. The sliding plate was smaller than the stationary plate, was made from a transparent material and was mounted on the exterior side of the valve. A syringe was connected to the fixture to allow application of a pressure bias to the valve, and an electrical heating element was attached to the stationary plate to allow testing at elevated temperatures. The internal pressure within the can could be measured with a manometer, the temperature of the stationary plate could be determined with a thermocouple, and the oil meniscus could be observed with a microscope. Oil was added to fill the interface between the plates until a meniscus was formed around the entire perimeter of the sliding plate and the edges of the holes in both plates. Several types of oil were tested.

The valve was observed at various temperatures and applied pressures. As the pressure bias was increased, intermittent breaches of the oil seal between the plates would occur. This was evident from the meniscus between the oil and the plates, as observed around and through the clear sliding plate, with the meniscus being displaced to create an open pathway between one or more holes in the stationary plate and at least one hole in and/or edge of the sliding plate. Oil viscosity appeared to have an effect on the internal pressure the oil seal was able to tolerate without being breached only over time. Over time the meniscus was observed to move outward on the stationary plate, away from the periphery of the sliding plate, especially at higher temperatures (lower oil viscosities), contributing to breaches in the oil seal at lower internal pressures. In addition, the greater the surface tension between the oil and the plates (as determined from the measured contact angle of the oil seal meniscus with the plate surfaces), the greater the pressure the oil seal was able to tolerate before being breached.

EXAMPLE 2

Additional testing was done with a modified test fixture. The modified test fixture included an empty rectangular shaped can with a sliding plate valve mounted across its open end. The valve was a rotating valve, with trapezoidal slots in both plates, similar to the valve shown in FIGS. 18 and 19. The rotating valve plate was on the exterior side of the valve. Both plates were made from nickel silver (NS106, hard). The valve also included an acrylic lever arm mounted to an acrylic frame plate and two SMA actuators, as shown in FIGS. 18 and 19 and described above.

With the valve closed and the gap between the valve plates at 58 to 64 µm, KRYTOX® 102 grade oil (a clear, colorless, fluorinated, synthetic oil) with 1 weight percent 7 µm diameter polymethylmethacrylate beads added, was wicked into the interface between the plates until an oil meniscus was observed around the slots in both plates and the peripheral edges of the rotating plate.

The fixture was placed with the interfacial plane between the plates in a horizontal position, and the valve was observed over a period of 168 hours at room temperature. After 24 hours oil had spread across the surface of the stationary plate, as determined by the presence of beads that were in the oil. By 168 hours the oil meniscus had receded from some edges of the slots in the stationary plate. These effects were expected to be accelerated by use of the valve (rotation of the rotating plate), the presence of internal pressure on the interior side of the valve and orienting the valve in other positions besides horizontal. The observations indicated that over time the oil layer between the plates can flow out of the interface between the plates so it no longer provides an effective seal between the adjacent surfaces of the plates, and a means of containing the fluid of the sealing medium within the interface between the plates is needed.

EXAMPLE 3

Various films were selected for evaluation of their ability to retain the fluid of the sealing medium between the valve plates. The materials selected and typical characteristics are summarized in Table 1. Thickness can be determined according to ASTM D-374. Apparent density can be determined from a 2.286 cm (0.900 inch)×20.27 cm (7.98 inch) sample by dividing the sample weight by the sample volume based on an average of 5 thickness measurements. Gurley air permeability can be determined using a Gurley densometer with a 0.254 cm (0.1 $inch^2$) orifice as the time for 2.5 $cm^2$ of air to pass through the sample at a pressure drop of 30.99 cm (12.2 inches) of water. Average pore size can be determined by measuring the pressure required to produce the first nitrogen bubble through a sample on an alcohol bubble point test, using a capillary flow porometer (such as model number CFP-1500-AEXMC, manufactured by Porous Materials, Inc., Ithica, N.Y., USA) and calculating the pore radius, which is inversely proportional to the pressure. A sample is clamped into the bubble point tester fixture, isopropyl alcohol is poured into the receptacle so the alcohol level is approximately midway between the sample and the top of the fixture, the tester is pressurized with nitrogen, and the mercury level in the manometer is recorded when the first bubble emerges from the sample. The pore radius (r) in micrometers is calculated from the following equation $$r=(43.4 \times COS\ Theta)/(3.39 \times P)$$

where Theta is the contact angle of the alcohol on the sample and P is the pressure in inches of mercury.

To retain the fluid of the sealing medium within the interface between the valve plates when the valve is oriented with the interfacial plane between the plates in a vertical position, the capillary pressure must exceed the gravitational pressure acting on the volume of fluid contained in the interface between the plates. The height of a column of fluid that can be supported by a layer of porous material between the plates is a function of the porosity, pore size and tortuosity of the porous material and can be converted to an equivalent capillary pressure. For a porous material to help retain the sealing fluid between vertical plates in a sliding plate valve, the fluid should therefore be capable of wicking up a vertical strip of the porous material.

A wicking test can be used to determine the height to which the sealing fluid will wick up a vertical strip of porous material as a function of time; the greater the wicking, the more effective the porous material in retaining the fluid between the plates. The wicking test was done by hanging a strip of each sample vertically from one end with the other end dipped in the fluid, periodically measuring the height to which the fluid wicked (the wicking height) on each sample, and recording the times and wicking heights. The ends of the samples dipped in the fluid can be fastened beneath the surface of the fluid to keep the strips taut during the test. The following formula can be used to calculate the maximum wicking height and a time constant related to the geometry of the pores for each sample tested:

$$h/h_{max}+Ln[1-(h/h_{max})]=-at$$

where h is the wicking height at time t, $h_{max}$ is the maximum wicking height and a is the time constant.

TABLE 1

| Description | Manufacturer and Designation | Thickness (mm) | Gurley Air Permeability (seconds) | Apparent Density (g/cm³) | Ave. Pore Size (µm) |
|---|---|---|---|---|---|
| Polytetrafluoro-ethylene film | Goodfellow Cambridge FP301265 | 0.063 | | | |
| Polytetrafluoro-ethylene film | Goodfellow Cambridge FP301220 | 0.063 | | | |

TABLE 1-continued

| Description | Manufacturer and Designation | Thickness (mm) | Gurley Air Permeability (seconds) | Apparent Density (g/cm$^3$) | Ave. Pore Size (μm) |
|---|---|---|---|---|---|
| Low density natural unsintered PTFE | EGC Plastics CD123 PTFE Membrane | 0.1016 | 150 | 1.60 | 0.0476 |
| Low density expanded natural unsintered PTFE tape | EGC Plastics 3P 0.0040" LD Natural Unsintered PTFE Tape | 0.1118 | 3.68 | 0.77 | 0.1270 |
| Natural unsintered PTFE | W. L. Gore Excellerator S30517 High Strength Gas Diffusion Membrane | 0.1016 | 525.6 | 1.55 | 0.0456 |
| Low density natural unsintered PTFE | EGC Plastics CD123 PTFE Membrane | 0.0508 | | 1.60 | |
| Natural unsintered PTFE | W. L. Gore Excellerator High Strength Gas Diffusion Membrane | 0.0508 | 255 | 1.55 | |
| Natural sintered PTFE | DeWal Industries D/W 202 Skived PTFE (ASTM D3308 Type 1) | 0.0508 | | | |
| Natural homopolymer polypropylene | Toray Plastics America TXG501-0100 | 0.0102 | | | 0.1314 |
| Biaxially oriented microporous polyethylene separator | Tonen Chemical Corp. SETELA ® Separator | 0.0178 | 400 | 13.64 | 0.0367 |
| 100% highly purified high density bleached Kraft paper bonded with Melamine resin | Kimberly Clark S3703 Separator Paper | 0.1067 | 22.0 | 0.03 | 12.7433 |
| Hydrophobic polypropylene separator | Celgard Membrane #3501 | 0.0254 | | 0.001 | 0.0696 |
| Low density polyethylene | National Bag Company Multi-Purpose Polyethylene Bag, 4 Mil | 0.1016 | | | |
| DURA-LAR ® (MYLAR ®) polyester film | McMaster-Carr Supply Co. Catalog No. 8567K42 Clear PET Film, 0.004 in. | 0.0992 | * | | |
| Polypropylene film | Goodfellow Catalog No. PP301400 Polypropylene | 0.1000 | * | | |
| Unsintered virgin PTFE film | McMaster-Carr Supply Co. Catalog No. 8569K143 TEFLON ® Film, 0.003 in. | 0.0841 | * | | |

* Essentially no air passed through the sample during more than one day on the test.

The wicking test was done using KRYTOX® 102 oil and a number of the films in Table 1. The results including calculations for each of the film types tested are summarized in Table 2.

TABLE 2

| Film (Manufacturer or Supplier and Designation) | Thickness (mm) | a (1/min.) | 1/a (hrs.) | h$_{max}$ (mm) |
|---|---|---|---|---|
| Goodfellow FP301265 PTFE Film | 0.063 | 4.30 × 10$^{-6}$ | 3879 | 278.2 |
| Goodfellow FP301220 PTFE Film | 0.063 | 1.43 × 10$^{-6}$ | 11694 | 575.7 |
| EGC Plastics CD123 PTFE Film | 0.1016 | 3.27 × 10$^{-6}$ | 5101 | 102.9 |
| EGC Plastics 3P Expanded PTFE Tape | 0.1016 | 1.70 × 10$^{-6}$ | 9802 | 216.3 |
| W. L. Gore S30517 | 0.1016 | 6.68 × 10$^{-7}$ | 24953 | 100.8 |
| High Strength PTFE EGC Plastics CD123 PTFE Film | 0.0508 | 6.64 × 10$^{-7}$ | 25114 | 182.9 |
| W. L. Gore Excellerator High Strength PTFE | 0.0508 | 3.30 × 10$^{-7}$ | 50429 | 184.6 |

Preferably the h$_{max}$ value will be at least as great as the maximum interfacial surface dimension of the valve to retain the fluid between the valve plates when the interfacial plane of the plates is in a vertical position. This testing showed that all of the microporous films tested can help retain KRYTOX® 102 oil between the valve plates and suggests that the Goodfellow FP301220 PTFE film may be the most effective in larger valves. The large time constants (the values for 1/a in Table 2) for the films tested suggest that a significant amount of time would be required for the oil to move through the film, so the films should retain the oil for substantially longer periods of time than without the films as fluid containment layers in valves.

EXAMPLE 4

The wicking test described above was done on various combinations of sealing fluids and films. In addition to KRYTOX® 102 general purpose lubricant (a perfluoropolyether), Dow Corning 200® 20 cSt fluid (a silicone based fluid), Dow Corning 705 diffusion pump oil (a silicone based fluid) and Dow Corning 704 diffusion pump oil (a silicone based fluid) were included. Properties of these materials are summarized in Table 3.

TABLE 3

| Sealing Fluid | Viscosity | Density | Volatility |
|---|---|---|---|
| KRYTOX ® 102 General Purpose Lubricant | 38 cSt (20° C.) | 1.91 g/mL (0° C.) 1.72 g/mL (100° C.) | 35% (22 hrs. at 121° C.) (ASTM D2595) |
| Dow Corning ® 200 ® Fluid, 20 cSt | 20 cSt | Specific Gravity 0.949 (25° C.) | |
| Dow Corning ® 705 Diffusion Pump Oil | 175 cSt (25° C.) | Specific Gravity 1.09 (25° C.) | Vapor Pressure $3 \times 10^{-10}$ torr (25° C.) |
| Dow Corning ® 704 Diffusion Pump Oil | 39 cSt (25° C.) | Specific Gravity 1.07 (25° C.) | Vapor Pressure $2 \times 10^{-8}$ torr (25° C.) |

The wicking height, h, was measured at various times, and the results are summarized in Table 4.

The DeWal Industries D/W 202 material (a sintered PTFE) did not substantially wick the fluids tested. Materials that are typically used as battery separator materials (e.g., the Tonen SETELA® polyethylene separator, the Kimberly Clark S3703 Kraft paper separator and the Celgard #3501 separator materials) tended to wick the fluids better than the other films. In general, the Dow Corning 705® oil (a silicone based oil) tended to wick less than the other fluids with all of the films tested, particularly with the PTFE films. The Dow Corning 704® oil (a less viscous silicone based oil than the 705® oil) did not wick the PTFE films well but wicked some of the other films relatively well compared to the other fluids tested. The data in Table 4 show that it is desirable to consider interactions between the fluids and materials for the fluid containment layer.

TABLE 4

| Film Supplier/ Manufacturer and Designation | Thickness (mm) | Time on Test | KRYTOX ® 102 General Purpose Lubricant | Dow Corning ® 200 ® Oil | Dow Corning ® 705 Diffusion Pump Oil | Dow Corning ® 704 Diffusion Pump Oil |
|---|---|---|---|---|---|---|
| Goodfellow FP301265 PTFE Film | 0.063 | — | — | — | — | — |
| Goodfellow FP301220 PTFE Film | 0.063 | — | — | — | — | — |
| EGC Plastics CD 123 PTFE Membrane | 0.1016 | 10 min. 1 hour 18 hours | no change 1.52 mm (0.060 in.) 6.35 mm (0.250 in.) | 1.52 mm (0.060 in.) 3.18 mm (0.125 in.) 14.3 mm (0.563 in.) | no change no change no change | no change no change no change |
| EGC Plastics Expanded PTFE Tape | 0.1118 | 10 min. 1 hour 18 hours | 3.18 mm (0.125 in.) 3.96 mm (0.156 in.) 15.9 mm (0.625 in.) | 2.39 mm (0.094 in.) 3.96 mm (0.156 in.) 12.7 mm (0.500 in.) | no change no change 4.78 mm (0.188 in.) | no change no change 1.60 mm (0.063 in.) |
| W. L. Gore S30517 Excellerator High Strength PTFE | 0.1016 | — | — | — | — | — |
| EGC Plastics CD 123 PTFE Membrane | 0.0508 | — | — | — | — | — |
| W. L. Gore Excellerator High Strength PTFE | 0.0508 | 10 min. 1 hour 18 hours | 1.60 mm (0.063 in.) 3.18 mm (0.125 in.) 6.35 mm (0.250 in.) | 2.36 mm (0.093 in.) 3.18 mm (0.125 in.) 7.95 mm (0.313 in.) | no change no change no change | no change no change 1.60 mm (0.063 in.) |
| DeWal Industries D/W 202 Skived PTFE | 0.0508 | 10 min. 1 hour 18 hours | no change no change no change | no change no change no change | no change no change no change | no change no change no change |
| Toray Plastics Natural Homopolymer Polypropylene | 0.0102 | 10 min. 1 hour 18 hours | 1.98 mm (0.078 in.) 3.18 mm (0.125 in.) 11.1 mm (0.438 in.) | 3.18 mm (0.125 in.) 7.14 mm (0.281 in.) 19.1 mm (0.750 in.) | 0.79 mm (0.031 in.) 0.79 mm (0.031 in.) 6.35 mm (0.250 in.) | 3.18 mm (0.125 in.) 4.78 mm (0.188 in.) 11.1 mm (0.438 in.) |
| Tonen Polyethylene Separator | 0.0178 | 10 min. 1 hour 18 hours | 3.18 mm (0.125 in.) 3.18 mm (0.125 in.) 6.35 mm (0.250 in.) | 4.78 mm (0.188 in.) 6.35 mm (0.250 in.) 12.7 mm (0.500 in.) | no change 2.29 mm (0.090 in.) 3.96 mm (0.156 in.) | 3.18 mm (0.125 in.) 3.18 mm (0.125 in.) 16.9 mm (0.667 in.) |
| Kimberly Clark S3703 Kraft Paper | 0.1067 | 10 min. 1 hour 18 hours | 9.53 mm (0.375 in.) 19.1 mm (0.750 in.) 60.3 mm (2.375 in.) | 18.6 mm (0.734 in.) 38.1 mm (1.500 in.) 97.6 mm (3.844 in.) | 9.53 mm (0.375 in.) 15.9 mm (0.625 in.) 47.6 mm (1.875 in.) | 15.9 mm (0.625 in.) 25.4 mm (1.000 in.) 105 mm (4.125 in.) |
| Celgard #3501 Hydrophobic | 0.0254 | 10 min. 1 hour | 3.18 mm (0.125 in.) 4.78 mm (0.188 in.) | 1.60 mm (0.063 in.) 3.96 mm (0.156 in.) | 0.79 mm (0.031 in.) 1.60 mm (0.063 in.) | 0.79 mm (0.031 in.) 1.60 mm (0.063 in.) |

TABLE 4-continued

| Film Supplier/Manufacturer and Designation | Thickness (mm) | Time on Test | KRYTOX® 102 General Purpose Lubricant | Dow Corning® 200® Oil | Dow Corning® 705 Diffusion Pump Oil | Dow Corning® 704 Diffusion Pump Oil |
|---|---|---|---|---|---|---|
| Polypropylene National BagMulti-Purpose Polyethylene Bag | 0.1016 | 18 hours | 4.78 mm (0.188 in.) | 3.96 mm (0.156 in.) | 2.79 mm (0.110 in.) | 3.58 mm (0.141 in.) |
| DURA-LAR® clear polyester film | 0.0992 | 10 min. | 6 mm (0.236 in.) | | | |
| | | 1 hour | 7 mm (0.276 in.) | | | |
| | | 18 hours | 9 mm (0.354 in.) | | | |
| Goodfellow Polypropylene film | 0.1000 | 10 min. | no change | | | |
| | | 1 hour | no change | | | |
| | | 18 hours | 1 mm (0.039 in.) | | | |
| Unsintered virgin PTFE film | 0.0841 | 10 min. | 2 mm (0.079 in.) | | | |
| | | 1 hour | 2 mm (0.079 in.) | | | |
| | | 18 hours | 2 mm (0.079 in.) | | | |

EXAMPLE 5

Two of the 0.1016 mm thick films in Table 1 (EGC Plastics CD123 PTFE and W.L. Gore Excellerator PTFE) were tested with KRYTOX® 102 oil in the test fixture valve described in Example 2. The test fixture was further modified include a capacitive type humidity sensor to measure relative humidity within the can with the valve closed, and a separate capacitive type humidity sensor was used to measure the relative humidity in a controlled humidity environment (13 percent, maintained with dry lithium chloride salt) outside the test fixture in order to calculate the leak rate due to diffusion through the valve.

For each test, a sheet of the film was cut to the shape of and laid on the stationary plate of the valve, and slots corresponding to the openings in the stationary plate were cut in the film with a laser. The valve was assembled in a closed position, with the openings in the stationary plate and film misaligned with the openings in the moving plate. Oil was applied to the exposed surface of the film and allowed to wick into the film between the plates at room temperature. The oil meniscus was observed and the relative humidity inside and outside the test fixture was monitored for 388 hours. No breaches in the seal were observed, and the average leak rate through the seals was about 0.6 μg/hour.

Although the present invention has been described above with respect to single batteries having a single cell, aspects of the present invention may apply to batteries having multiple cells, and battery packs having multiple batteries. For example, the air regulating system may be completely or partially disposed in a housing of a battery pack so as to selectively open and close a valve that allows air to pass into the battery pack housing. In this case, separate air regulating systems would not be needed for each battery. Further, the air regulating system could be powered from any one or group of the batteries or all of the batteries within the battery pack or from another battery outside the battery pack.

The air regulating system may also be disposed completely or partially within a device that is powered by the battery, batteries, or battery pack or otherwise provided separate from the battery, batteries, or battery pack. For example, the valve could be a pre-packaged module that serves a variety of multi-cell pack sizes. So there may be advantages to packaging the valve, valve power supply and controls separately from the gas consuming cells.

The combination of a gas consuming battery and an air regulating system can include a module containing all or a portion of the air regulating system into which one or more replaceable gas consuming batteries are inserted. This allows reuse of at least part of the air regulating system, thereby reducing the cost per battery to the user. The module can include one or more air inlets and can also include internal channels, plenums or other internal spaces that provide a passageway for air to reach the battery. The module and battery can be held together in any suitable manner, including the use of electrical contacts that are part of the module that cooperate with the corresponding electrical contacts that are part of the battery to prevent inadvertent separation of the module and battery. For example, the electrical contacts on the module can be in the form of projecting blades that snap into slots in the battery case that contain the battery electrical contacts. The blades can be held in the slots by any suitable means, such as by interference fit, one or more springs, a mechanical locking mechanism and various combinations thereof. The module and battery dimensions, shapes and electrical contacts can be configured to allow mating of the module and battery in only the proper orientations in order to assure proper electrical contact and prevent battery reversal. The module, the battery or both can have external contact terminals for making proper electrical contact with a device in which the combined battery and module are installed. In some embodiments the battery can be replaced without removing the module from the device.

What is claimed is:

1. An air regulating system for controlling the passage of air into a battery cell using a gas in the air as an active material, the air regulating system comprising:
   a valve comprising a first plate having at least one aperture therethrough and a second plate having at least one aperture therethrough;
   an actuator for moving the first plate relative to the second plate to open and close the valve to regulate the passage of air; and
   a sealing medium disposed between the first plate and the second plate, the sealing medium comprising a fluid containment layer and a fluid partially contained within the fluid containment layer; wherein:
   the fluid containment layer comprises a porous polymeric material having an average pore size of from 0.03 micrometer to 15 micrometers, as determined by a bubble point method using a capillary flow porometer; and
   a maximum wicking height of the fluid on the porous polymeric material is equal to or greater than a maximum interfacial dimension of the first and second plates, the maximum wicking height being determined by suspending a strip of the porous polymeric material vertically above a surface of a sample of the fluid.

2. The air regulating system according to claim 1, wherein the height to which the strip of porous polymeric material is capable of wicking the fluid in 18 hours after immersion of the edge of the strip in the fluid is from 10 mm to 100 mm.

3. The air regulating system according to claim 2, wherein the height to which the strip of porous polymeric material is capable of wicking the fluid in 18 hours after immersion of the edge of the strip in the fluid is greater than 11 mm.

4. The air regulating system according to claim 2 or claim 3, wherein the height to which the strip of porous polymeric material is capable of wicking the fluid in 18 hours after immersion of the edge of the strip in the fluid is no greater than 61 mm.

5. The air regulating system according to claim 1, wherein the porous polymeric material selected from the group consisting of polytetrafluoroethylene, polypropylene, and polyethylene.

6. The air regulating system according to claim 5, wherein the microporous film comprises polytetrafluoroethylene.

7. The air regulating system according to any preceding claim, wherein the porous polymeric material is a non-sintered material.

8. The air regulating system according to any preceding claim, wherein the porous polymeric material has a Gurley air permeability value of from 3 seconds to 500 seconds.

9. The air regulating system according to any preceding claim, wherein the porous polymeric material has an average pore size from 0.04 micrometer to 15 micrometers.

10. The air regulating system according to claim 9, wherein the porous polymeric material has an average pore size of from at least 10 micrometers to 15 micrometers.

11. The air regulating system according to claim 9, wherein the porous polymeric material has an average pore size of from 0.04 micrometer to less than 12 micrometers.

12. The air regulating system according to any preceding claim, wherein the fluid comprises at least one fluid selected from the group consisting of fluorinated synthetic fluids and silicone based fluids.

13. The air regulating system according to claim 12, wherein the fluid comprises a perfluoropolyether.

14. The air regulating system according to claim 12, wherein the fluid comprises a siloxane polymer.

15. A battery comprising:
- a battery cell comprising a gas consuming electrode using a gas contained in air from outside the cell as an active material;
- a counter electrode;
- an electrolyte;
- a housing containing the electrodes and electrolyte and having at least one opening through which air can enter the housing; and
- an air regulating system according to any of the preceding claims.

* * * * *